United States Patent
Leone et al.

(10) Patent No.: US 9,776,624 B1
(45) Date of Patent: Oct. 3, 2017

(54) METHOD AND SYSTEM FOR ENGINE CONTROL

(71) Applicant: Ford Global Technologies, LLC, Dearborn, MI (US)

(72) Inventors: Thomas G. Leone, Ypsilanti, MI (US); Kenneth James Miller, Canton, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/146,720

(22) Filed: May 4, 2016

(51) Int. Cl.
*B60W 20/14* (2016.01)
*B60W 10/06* (2006.01)
(Continued)

(52) U.S. Cl.
CPC ............... *B60W 20/14* (2016.01); *B60K 6/24* (2013.01); *B60K 6/26* (2013.01); *B60K 6/40* (2013.01); *B60W 10/06* (2013.01); *B60W 10/08* (2013.01); *B60W 10/26* (2013.01); *F02D 19/0649* (2013.01); *F02D 19/081* (2013.01);
(Continued)

(58) Field of Classification Search
CPC ...... B60W 20/14; B60W 10/06; B60W 10/08; B60W 10/26; B60W 2710/0644; B60W 2710/0677; B60W 2710/244; B60K 6/24; B60K 6/26; B60K 6/40; B60Y 2200/92; B60Y 2400/43; F02D 19/0649; F02D 19/081; F02D 2200/10; Y10S 903/905;
(Continued)

(56) References Cited

U.S. PATENT DOCUMENTS

| 3,254,620 A | 6/1966 | Cannon |
| 3,640,894 A | 2/1972 | Sampson et al. |

(Continued)

FOREIGN PATENT DOCUMENTS

| CA | 2762747 A1 | 7/2012 |
| CN | 1223335 A | 7/1999 |

(Continued)

OTHER PUBLICATIONS

Hoffmann, W., et al., "A New Approach to Ethanol Utilization: High Efficiency and Low NOx in an Engine Operating on Simulated Reformed Ethanol," SAE Technical Paper 2008-01-2415, Powertrains, Fuels & Lubricants Meeting, Rosemont, IL, Oct. 6-9, 2008, 11 pages.

(Continued)

*Primary Examiner* — Calvin Cheung
(74) *Attorney, Agent, or Firm* — David Kelley; McCoy Russell LLP

(57) ABSTRACT

Methods and systems are provided for synergizing the benefits of an electric fuel separator in a hybrid vehicle system. A vehicle controller may hold the engine in a narrow operating range where usage of a selected higher octane or lower octane fuel fraction is optimal while using motor and/or CVT adjustments to address transients generated as driver demand varies. The controller may also adjust a fuel separator speed/pressure opportunistically during regenerative braking to maximize electrical usage as well as at low load conditions to enable extended engine operation in a more fuel efficient load region.

20 Claims, 7 Drawing Sheets

(51) Int. Cl.
*B60W 10/08* (2006.01)
*B60W 10/26* (2006.01)
*B60K 6/24* (2007.10)
*B60K 6/26* (2007.10)
*B60K 6/40* (2007.10)
*F02D 19/08* (2006.01)
*F02D 19/06* (2006.01)

(52) U.S. Cl.
CPC ............ *B60W 2710/0644* (2013.01); *B60W 2710/0677* (2013.01); *B60W 2710/244* (2013.01); *B60Y 2200/92* (2013.01); *B60Y 2400/43* (2013.01); *F02D 2200/10* (2013.01); *Y10S 903/905* (2013.01); *Y10S 903/906* (2013.01); *Y10S 903/93* (2013.01); *Y10S 903/951* (2013.01)

(58) Field of Classification Search
CPC . Y10S 903/906; Y10S 903/93; Y10S 903/951
See application file for complete search history.

(56) References Cited

U.S. PATENT DOCUMENTS

| | | | |
|---|---|---|---|
| 4,391,716 A | 7/1983 | McCurry | |
| 4,505,169 A | 3/1985 | Ganoung | |
| 5,237,978 A | 8/1993 | Bailey | |
| 5,408,874 A | 4/1995 | Fleck, Sr. et al. | |
| 5,785,136 A | 7/1998 | Falkenmayer et al. | |
| 5,806,617 A | 9/1998 | Yamaguchi | |
| 6,116,363 A | 9/2000 | Frank | |
| 6,276,473 B1 | 8/2001 | Zur Megede | |
| 6,332,448 B1* | 12/2001 | Ilyama | F02D 19/0605 123/304 |
| 6,378,637 B1 | 4/2002 | Ono et al. | |
| 6,450,193 B1 | 9/2002 | Constantinou | |
| 6,655,324 B2 | 12/2003 | Cohn et al. | |
| 6,691,684 B1* | 2/2004 | Bruenemann | F02M 1/165 123/525 |
| 6,715,452 B1 | 4/2004 | Taylor, III et al. | |
| 6,715,453 B2 | 4/2004 | Tomatsuri et al. | |
| 6,796,287 B2 | 9/2004 | Mogi et al. | |
| 6,915,766 B2 | 7/2005 | Aoyama et al. | |
| 6,929,582 B2 | 8/2005 | Yang et al. | |
| 6,970,781 B1 | 11/2005 | Chen et al. | |
| 7,013,878 B1* | 3/2006 | Cotton | F02M 37/20 123/41.31 |
| 7,213,397 B2 | 5/2007 | Hu et al. | |
| 7,258,099 B2 | 8/2007 | Yoshida et al. | |
| 7,267,087 B2 | 9/2007 | Glugla | |
| 7,295,902 B2 | 11/2007 | Chen et al. | |
| 7,389,751 B2* | 6/2008 | Leone | F02D 19/0628 123/1 A |
| 7,426,907 B2 | 9/2008 | Dearth et al. | |
| 7,676,321 B2 | 3/2010 | Andri | |
| 7,703,435 B2 | 4/2010 | Surnilla et al. | |
| 7,748,481 B2 | 7/2010 | Holmes et al. | |
| 7,805,238 B2 | 9/2010 | Andri | |
| 7,826,957 B2 | 11/2010 | Fabien | |
| 7,832,511 B2 | 11/2010 | Syed et al. | |
| 7,845,315 B2 | 12/2010 | Leone et al. | |
| 7,925,418 B2 | 4/2011 | Fabien | |
| 8,015,951 B2 | 9/2011 | Dearth et al. | |
| 8,050,831 B2 | 11/2011 | Martin et al. | |
| 8,065,979 B2 | 11/2011 | Leone et al. | |
| 8,118,009 B2 | 2/2012 | Pursifull et al. | |
| 8,127,745 B2 | 3/2012 | Surnilla et al. | |
| 8,141,356 B2 | 3/2012 | Leone et al. | |
| 8,312,867 B2 | 11/2012 | Pursifull et al. | |
| 8,375,899 B2 | 2/2013 | Leone et al. | |
| 8,387,591 B2 | 3/2013 | Surnilla et al. | |
| 8,539,914 B2 | 9/2013 | Kerns et al. | |
| 8,550,058 B2 | 10/2013 | Pursifull et al. | |
| 8,606,474 B2 | 12/2013 | Guo et al. | |
| 8,656,869 B2 | 2/2014 | Leone et al. | |
| 8,701,630 B2 | 4/2014 | Surnilla et al. | |
| 8,738,255 B2 | 5/2014 | Carter et al. | |
| 8,746,189 B2 | 6/2014 | Kawasaki | |
| 9,038,613 B2 | 5/2015 | Pursifull et al. | |
| 9,151,249 B2* | 10/2015 | Hyde | F02M 21/0209 |
| 9,157,385 B2 | 10/2015 | Gallagher et al. | |
| 9,376,967 B2 | 6/2016 | Springer et al. | |
| 2004/0188154 A1 | 9/2004 | Carlson | |
| 2005/0211482 A1* | 9/2005 | Meaney | B60K 6/22 180/65.245 |
| 2008/0092834 A1* | 4/2008 | Stein | F01L 13/0036 123/90.15 |
| 2008/0277174 A1* | 11/2008 | Grabbe | B60K 6/32 180/65.25 |
| 2010/0063658 A1 | 3/2010 | Martin et al. | |
| 2011/0029177 A1 | 2/2011 | Yeung et al. | |
| 2011/0246010 A1 | 10/2011 | de la Torre Bueno | |
| 2012/0055452 A1* | 3/2012 | DeBastos | F02M 25/0818 123/521 |
| 2013/0014731 A1* | 1/2013 | Pursifull | F02B 43/10 123/525 |
| 2013/0055990 A1 | 3/2013 | Kamada | |
| 2014/0067540 A1 | 3/2014 | Williams et al. | |
| 2014/0116395 A1 | 5/2014 | Blackstock | |
| 2014/0202430 A1 | 7/2014 | Monros | |
| 2015/0059700 A1* | 3/2015 | Leone | F02D 41/1456 123/445 |
| 2015/0114359 A1 | 4/2015 | Leone et al. | |
| 2015/0114370 A1* | 4/2015 | Leone | F02D 41/0025 123/575 |
| 2015/0300830 A1 | 10/2015 | Fisher | |
| 2015/0376801 A1* | 12/2015 | Bairamijamal | B01D 53/002 204/257 |

FOREIGN PATENT DOCUMENTS

| | | |
|---|---|---|
| CN | 103291468 A | 9/2013 |
| CN | 104005861 A | 8/2014 |
| CN | 203756344 U | 8/2014 |
| JP | 407019124 A | 1/1995 |
| JP | 2006257907 A | 9/2006 |
| JP | 2007077918 A | 3/2007 |
| SU | 0731020 | 4/1980 |
| SU | 0848725 | 7/1981 |
| WO | 2007027327 A2 | 3/2007 |

OTHER PUBLICATIONS

Kadota, M. et al., "Advanced Control System of Variable Compression Ratio (VCR) Engine with Dual Piston Mechanism," SAE International 2009-01-1063, Apr. 20, 2009, 10 pages.
Wheeler, Jennifer C. et al., "High Efficiency, Low Feedgas NOx, and Improved Cold Start Enabled by Low Temperature Ethanol Reforming," SAE International 2010-01-0621, Apr. 12, 2010, 18 pages.
Wheeler, Jennifer C. et al., "Low-Temperature Ethanol Reforming: A Multi-Cylinder Engine Demonstration," SAE International 2011-01-0142, Apr. 12, 2011, 20 pages.
Kleeberg, Henning et al., "Increasing Efficiency in Gasoline Powertrains with a Two-Stage Variable Compression Ratio (VCR) System," SAE International 2013-01-0288, Apr. 8, 2013, 10 pages.
Morgenstern, David et al., "Integration of an E85 Reforming System into a Vehicle-Ready Package and Project Results," SAE International 2014-01-1191, Apr. 1, 2014, 12 pages.
Ferrey, Paul et al., "Potential of a Variable Compression Ratio Gasoline SI Engine with Very High Expansion Ratio and Variable Valve Actuation," SAE International 2014-01-1201, Apr. 1, 2014, 20 pages.
Glugla, Chris Paul, "Method and System for Pre-Ignition Control," U.S. Appl. No. 14/604,279, filed Jan. 23, 2015, 54 pages.
Glugla, Chris Paul, "Method and System for Engine Control," U.S. Appl. No. 14/923,900, filed Oct. 27, 2015, 41 pages.
Miller, Kenneth James et al., "Method and System for Engine Control," U.S. Appl. No. 15/146,687, filed May 4, 2016, 54 pages.

(56) References Cited

OTHER PUBLICATIONS

Leone, Thomas G. et al., "Method and System for Hybrid Vehicle Control," U.S. Appl. No. 15/146,752, filed May 4, 2016, 46 pages.
Miller, Kenneth James et al., "Method and System for Engine Control," U.S. Appl. No. 15/146,784, filed May 4, 2016, 47 pages.
Miller, Kenneth James et al., "Method and System for Engine Control," U.S. Appl. No. 15/146,809, filed May 4, 2016, 52 pages.
Miller, Kenneth James et al., "Method and System for Engine Control," U.S. Appl. No. 15/146,822, filed May 4, 2016, 47 pages.

* cited by examiner

METHOD AND SYSTEM FOR ENGINE CONTROL

FIELD

The present description relates generally to methods and systems for controlling fuel usage in an engine of a hybrid vehicle system.

BACKGROUND/SUMMARY

Engines may operate using a plurality of different fuels, which may be separately delivered, or delivered in varying ratios, depending on operating conditions. For example, an engine may use a first fuel (e.g., ethanol) and a second fuel (e.g., gasoline), each with different knock suppression abilities, to reduce engine knock limitations while improving overall fuel economy. As another example, different fuels may result in different engine pumping work (for example, when the different fuels include a gaseous fuel versus a liquid fuel, or a port injected fuel versus a direct injected fuel). As still another example, different fuels may result in different parasitic losses (such as when the fuels include a fuel delivered via high pressure direct injection versus a fuel delivered via low pressure port injection). As still another example, an engine may use fuel injection and water injection.

Various approaches may be used to store different fuels and other substances (such as water for water injection) on-board a vehicle. For example, the different substances may be stored separately in different storage tanks, and thus filled separately. Alternatively, different substances may be stored in a mixed state (such as ethanol and gasoline), and then separated on-board the vehicle to enable individual control of delivery to the engine. For vehicle systems where the different substances are separated on-board, various separator systems may be included in the vehicle.

One example approach for on-board fuel separation is shown by Leone et al. in U.S. Pat. No. 7,845,315. Another example approach is shown by Dearth et al. in U.S. Pat. No. 8,015,951. The example approaches pressurize the fuel via an electric pump and then heat the pressurized fuel upon passage through a heat exchanger, the heat exchanger enabling heat transfer with coolant or exhaust. Next, the hot pressurized fuel is passed through a membrane unit which separates the mixed fuel into higher-octane fractions (such as ethanol) and lower-octane fractions (such as gasoline). The higher-octane fractions leave the separator as a vapor, but are condensed in a heat exchanger and pumped with an electric pump into a storage tank. Hot lower-octane fuel remains as a liquid fuel in the separator. This fraction is cooled in another heat exchanger and returned to the main fuel tank. In addition to the above-mentioned electrical components, when vehicle speed is low, electric fans may be used for the heat exchangers.

However the inventors herein have recognized potential issues with such systems. As an example, due to the large number of electrically operated components required for fuel separation, the electrical load on the vehicle system may be significant. As a result, during conditions when the engine is operating with high electrical loads, the fuel separation system may not be operated reliably. For example, there may be inefficient high currents. This can cause fuel separation to become limited. Fuel separation may also be inefficient at lower engine loads due to poor engine efficiency at lower loads, and thus poor efficiency of generating the electricity required for the separator. Thus during those conditions, the fuel economy benefit from the availability and usage of the higher octane fuel may be overshadowed by the fuel penalty associated with fuel separation at lower engine loads. Another potential issue is that the transaxle of the vehicle may not be able to operate at a speed-load condition that is optimal for a given fuel fraction. Likewise, during changes in driver demand, there may be rapid speed-load transitions which can cause the engine to operate at a less than optimal point for the given fuel. All of these issues result in the optimal fuel economy benefit of the on-board fuel separation system not being realized.

The inventors herein have recognized that by integrating a fuel separation system into a hybrid vehicle system, various synergies can be achieved. For example, the hybrid technology can enable the engine to be scheduled to operate at different engine speed-load points depending on which fuel is selected for use. In addition, the higher voltage system architecture of the hybrid vehicle can improve the efficiency of the electric fuel separator. In one example, potential synergies are attained by a method for a hybrid vehicle including an engine, comprising: transferring engine output to a generator, and supplying electric power from the generator to an electric fuel separator without the power required to operate the electric fuel separator being stored in a battery; and separating a fuel into higher octane and lower octane fractions at the separator. In addition, separator output may be opportunistically increased during selected conditions, such as during low load conditions and during regenerative braking. In this way, fuel economy of a vehicle can be enhanced.

As an example, a hybrid vehicle system may be configured with a battery powered electric motor (or motor/generator) for propelling vehicle wheels via motor torque, as well as an engine for propelling vehicle wheels via engine torque, the engine including an on-board electric fuel separator. The fuel separator may be operated during engine running conditions to separate fuel in the fuel tank into higher and lower octane fuel fractions. The engine may then be operated with one or more of the higher and lower octane fuel fractions. In particular, the engine may be operated to generate sufficient torque to propel the vehicle and operate the motor, the motor output then used to drive the fuel separator, the electric power for the fuel separator not stored in a system battery. As such, the electric motor of the hybrid vehicle may have a higher output (e.g., 48V) than an electric motor used on conventional vehicles (e.g., 12V). By driving the fuel separator via the generator during engine running, the higher rated electrical system of the hybrid vehicle can be leveraged to apply a higher voltage and lower current to the electric fuel separator, making the fuel separation more fuel efficient. In addition, by running the separator from excess motor/generator power, without storing the excess motor/generator power in a battery and then later extracting this power from the battery, efficiency losses associated with battery charging/discharging can be reduced. Fuel separator operation may also be opportunistically increased during selected conditions, such as when the vehicle electrical demand is lower, when the engine load is at or near a minimum load, or when excess electrical energy is available at the vehicle (e.g., during regenerative braking). During such conditions, the fuel separator output (e.g., speed or pressure) may be opportunistically increased to maximize fuel separation. In one example, by increasing the fuel separator pressure when the engine load is low, the engine load may be raised. The added electrical load may enable the engine to be operated at a more efficient speed-load, and therefore with higher fuel economy. The fuel separator may be disabled during engine running conditions when the vehicle electrical demand is higher. If a sufficient amount of fuel has already been separated, further fuel separation may be disabled when the engine is not running (such as when the vehicle is propelled by motor torque only).

Furthermore during engine operation, the electric motor of the hybrid vehicle and/or a continuously variable transmission may be leveraged to operate the engine with an engine speed-load profile optimized for the fuel being used while providing the driver torque demand. As an example, when operating the engine on a higher octane fuel fraction, a speed ratio of the CVT may be selected that operates the engine at a lower engine speed and a higher engine torque (for a given power level) to leverage the greater knock resistance and higher efficiency of the higher-octane fuel. As another example, when operating the engine on a lower octane fuel fraction, if the engine is knock limited, the CVT speed ratio may be used to operate the engine at a higher engine speed and a lower engine torque (for the given power level) to reduce the amount of spark retard (and the associated fuel penalty) required for knock mitigation. Furthermore, if the engine is knock limited, some battery power may be used to reduce the engine power/torque, so as to operate the engine at a same engine speed and a lower engine torque (for the given driver requested vehicle power level) to reduce the amount of spark retard (and the associated fuel penalty) required for knock mitigation.

In this way, fuel economy in a hybrid vehicle system can be improved. One of the technical effects of integrating on-board fuel separation technology in a hybrid vehicle is that an electrically powered fuel separator may be operated more reliably even as electrical loads vary. By driving the electrical fuel separator from the generator without going through the battery, fuel separation may be achieved while efficiency losses associated with charging and discharging a system battery are reduced. By leveraging the higher voltage of the hybrid vehicle for on-board fuel separation, lower currents and higher efficiencies can be achieved by the fuel separator. By improving the reliability of fuel separation, fuel usage and thereby fuel economy is improved. Furthermore, by scheduling an engine speed-load for a given fuel via adjustments to the hybrid motor and/or a continuously variable transmission, knock limitations are reduced, further improving fuel economy. The technical effect of using the higher voltage system of a hybrid electric vehicle for operating an electric fuel separator of an engine is that fuel separation can be completed when required with reduced parasitic losses, because the higher voltage system operates at lower current, which result in lower losses because electrical power losses are proportional to the square of current ($P_{loss}=i^2 R$). In addition, usage of a selected fuel fraction can be extended despite changes in driver or wheel torque demand.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
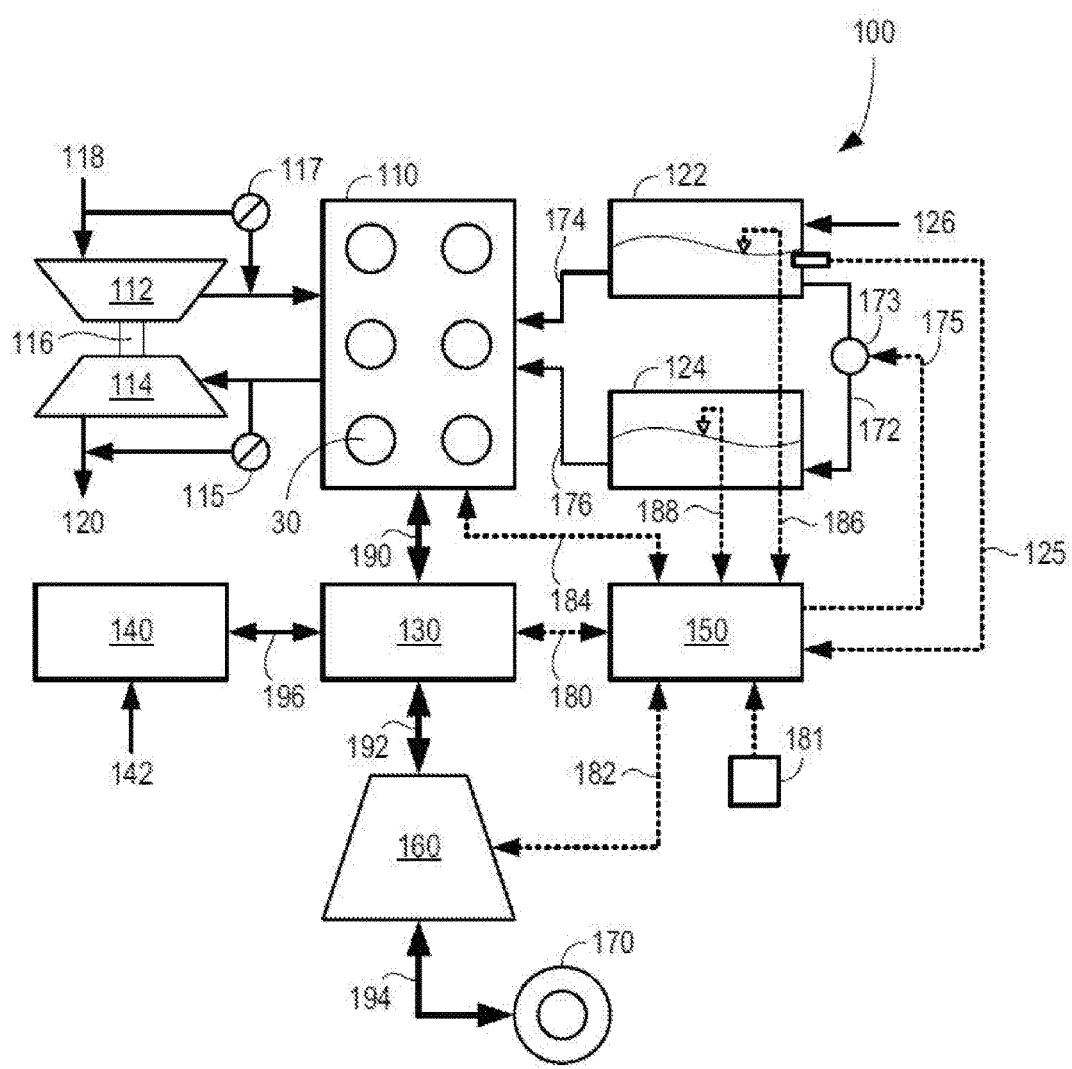
FIG. 1 illustrates an example propulsion system for a hybrid vehicle.

The following description relates to systems and methods for improving fuel economy in a hybrid vehicle, such as the vehicle system of FIG. 1. The vehicle system may include an engine configured for on-board fuel separation and usage of the separated fuel fractions, as described with reference to the engine system of FIG. 2 and the fuel separation system of FIG. 3. A vehicle controller may be configured to perform a control routine, such as the example routine of FIG. 4, to operate the fuel separator based on fueling requirements as well as hybrid vehicle operating conditions. The controller may increase an output of fuel separator during selected conditions to maximize fuel separation efficiency, as elaborated at FIG. 5. The controller may be further configured to use motor and/or CVT adjustments to operate the engine with an engine speed-load profile that is based on the selected fuel, the adjustments enabling engine knock limitations to be reduced, as elaborated with reference to FIG. 6. An example hybrid vehicle operation with on-board fuel separation and example fuel usage and motor adjustments is shown at FIG. 7. In this way, on-board fuel separation technology can be synergized with hybrid vehicle technology to achieve significant fuel economy improvements.

FIG. 1 schematically shows an example hybrid propulsion system 100 for a vehicle. Propulsion system 100 includes an engine 110 and a motor 130, each configured to selectively provide propulsive effort to at least one or more drive wheels 170 of the vehicle via a transmission 160, as indicated at 190, 192, and 194. Further, engine 110 and motor 130 can each also selectively receive energy from drivel wheel 170 in order to provide what may be referred to as regenerative braking of the vehicle. It should be appreciated that engine 110 and motor 130 can be arranged in a parallel or a series configuration to enable one or both of the engine and motor to supply or receive torque from drive wheel 170. Thus, the example shown in FIG. 1 should not be limited to a particular hybrid vehicle configuration. For example, propulsion system 100 may include two or more motors in other examples, and/or may include motor 130 positioned on an opposite side of transmission 160 from engine 110. As yet another example, engine 110 may be instead uncoupled from the drivetrain, wherein the engine may be selectively operated to generate energy that is usable by motor 130 for propelling the vehicle. As one non-limiting example, motor 130 may include an electric motor that can be supplied energy to provide torque and can be operated to generate electrical energy responsive to an input torque.

Propulsion system 100 may also include an energy storage device 140 communicating with motor 130 as indicated at 196. As one example, propulsion system 100 may be configured as a hybrid electric vehicle (HEV), wherein energy storage device 140 include one or more batteries or capacitors for storing electrical energy. Thus, as shown in FIG. 1, motor 130 can receive energy from energy storage device 140 or supply energy to energy storage device 140 as indicated at 196. Further, energy storage device 140 can receive energy from energy sources external the vehicle as indicated at 142. For example, propulsion system 100 may be configured as a plug-in hybrid electric vehicle, wherein energy storage device 140 can be connected to an external electrical energy supply via a suitable wire or cable to enable recharging of the energy storage device. In alternate examples, energy storage device 140 may be configured as a flywheel, a hydraulic energy storage device, a pneumatic energy storage device, etc. Accordingly, motor 130 may be configured as a pneumatic, hydraulic, or other motor.

Electric motor 130 may be operated in a regenerative mode, that is, as a generator, to absorb energy from vehicle motion and/or the engine and convert the absorbed kinetic energy to an energy form suitable for storage in energy storage device 140. Furthermore, electric motor 130 may be operated as a motor or generator, as required, to augment or absorb torque provided by the engine, such as during a transition of engine 110 between different combustion modes (e.g., during transitions between a spark ignition mode and a compression ignition mode). For example, during conditions when the engine torque output is higher than the driver demand, the torque difference may be absorbed at the motor and used to charge the battery, thereby smoothing out the torque transient.

Engine 110 is shown in FIG. 1 including a plurality of cylinders or combustion chambers 30. Engine 110 can receive intake air from ambient as indicated at 118 via a compressor 112, under select operating conditions. During other conditions, at least a portion of the intake air can bypass the compressor by way of a compressor bypass valve 117. In the particular example shown in FIG. 1, compressor 112 is powered by a turbine 114 arranged in an exhaust passage of the engine in a configuration that may be referred to as a turbocharger. Turbine 114 is shown coupled to compressor 112 via a shaft 116. Engine 110 can exhaust gases produced by the engine via an exhaust passage including turbine 114 during some conditions in order to power compressor 112. During other conditions, exhaust gases can bypass the turbine by way of a turbine bypass valve (or wastegate valve) 115. However, in other examples, compressor 112 can be powered by the engine or motor without requiring a turbine in a configuration that may be referred to as a supercharger. Thus, compressor 112 may be configured to provide boosted intake air to the engine with or without an exhaust gas turbine. In this way, each of the engine cylinders can receive intake air from ambient as indicated at 118 and exhaust products of combustion to ambient as indicated at 120. A detailed embodiment of engine 110 is described with reference to FIG. 2.

Engine 110 can also selectively receive two substances or fluids as indicated at 174 and 176. As one example, a first substance including a fuel or a fuel mixture may be delivered to the engine cylinders, as indicated at 174. For example, the first substance may include a fuel such as gasoline, diesel, or a mixture of fuel and other substances. A second substance, different than the first substance, may be delivered to the engine cylinders, as indicated at 176. As one non-limiting example, the second substance may include a greater concentration of a knock suppressing substance than the first substance. For example, the knock suppressing substance selectively delivered to the engine, as indicated at 176, may include an alcohol such as ethanol or methanol, or may include water, as another example. However, as indicated with regards to the first substance, a fuel delivered to the engine as indicated at 174 may also include the knock suppressing substance at a lower concentration than the second substance. Thus, it should be appreciated that the first and second substances may include similar components of different concentrations. As elaborated with reference to FIG. 3, the engine may be fueled with a single fuel, which is then separated via a fuel separation system into a first fuel fraction (e.g., a fuel fraction having a higher octane) and a second fuel fraction (e.g., a fuel fraction having a lower octane). The engine may then receive the first fuel fraction and the second fuel fraction as the first and second substances 174, 176. As one particular non-limiting example, the first substance selectively provided to the engine, as indicated at 174, includes liquid gasoline or a mixture of liquid gasoline and ethanol, and the second substance selectively provided to the engine, as indicated at 176, includes at least liquid ethanol. The knock suppressing substance may be selectively used at certain operating conditions to reduce the occurrence or likelihood of engine knock.

FIG. 1 further shows how the first substance may be separately delivered to the engine from a first storage tank 122 and the second substance may be separately delivered to the engine from a second storage tank 124. In this particular example, first storage tank 122 can receive a fuel mixture as indicated at 126, for example, during a refueling operation. The fuel mixture received at first storage tank 122 may include both a fuel and a knock suppressing substance. For example, the fuel mixture received at first storage tank 122 as indicated at 126 may include a mixture of gasoline and ethanol such as E85 which is approximately 85% ethanol and 15% gasoline; a mixture of gasoline and methanol such as M85 which is approximately 85% methanol and 15% gasoline; a mixture of gasoline and water; a mixture of an alcohol, water, and gasoline; mixtures of diesel and water; mixtures of diesel and an alcohol; or other suitable mixtures including a fuel and a knock suppressing substance that suppresses knock to a greater extent than the fuel contained in the fuel mixture. Further still, it should be appreciated that the fuel mixture received via 126 can include varying ratios of the fuel and the knock suppressing substance between different fueling stations. Thus, the system described herein may be configured to provide improved and more consistent propulsion system output for a given vehicle operator input for a range of fuel mixtures.

As one non-limiting example, the fuel mixture received at 126 may include a mixture of gasoline and ethanol in liquid form. At least some of the knock suppressing substance (e.g. ethanol) may be separated from the fuel mixture (e.g., gasoline and ethanol) via a separator 173 and passage 172. Separator 173 may also include a pump to enable separation of the knock suppressing substance from the fuel mixture and to enable transport of the knock suppressing substance from tank 122 to tank 124 via passage 172. However, in some embodiments, tank 124 may be omitted, whereby the knock suppressing substance is provided directly to engine 110 via separator 173. In other embodiments, a third storage tank may be provided, whereby the fuel mixture is initially received at a first storage tank, whereby the first substance and the second substance are separated to second and third tanks, respectively. In still other embodiments, tanks 122 and 124 may be separately filled with a first substance and a second substance, respectively, thereby not requiring separation of a fuel mixture including the first and the second substances. Regardless of the particular fuel system configuration, it should appreciated that a first and a second substance may be provided to at least one cylinder of the engine in varying relative amounts in response to operating conditions. A detailed embodiment of a fuel separation system that may be used in vehicle system 100 is described with reference to FIG. 3.

Hybrid propulsion system 100 may be operated in various embodiments including a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event. Accordingly, hybrid propulsion system 100 may be operated in various modes of operation.

For example, the hybrid vehicle may be driven in a first engine-on mode, herein also referred to as an "engine" mode, wherein engine 110 is operated and used as the primary source of power for powering wheels 170 (the motor/generator may also be providing torque to wheels if in motoring mode). During the "engine" mode, a selected fuel (or fuel mixture) may be supplied to engine 110 from the fuel tank via a fuel injector so that the engine can spin fueled to provide the torque for propelling the vehicle. Specifically, engine power is delivered to the wheels via the transmission. Optionally, the engine can be operated to output more power than is needed for propulsion, in which case the additional power is absorbed by the motor (operating as a generator) to charge energy storage device 140 or supply electrical power for other vehicle loads. In one example, in the engine mode, only engine power may be used to propel the vehicle wheels.

In another example, the hybrid vehicle may be driven in a second engine-on mode, herein also referred to as an "assist" mode. During the assist mode, engine 110 is operated and used as the primary source of power for powering wheels 170 while motor 130 is used as an additional torque source to act in cooperation with, and supplement the torque provided by engine 110. During the "assist" mode, as in the engine-only mode, fuel is supplied to engine 110 so as to spin the engine fueled and provide power to the vehicle wheels. In this mode, each of engine power and motor power is used to propel the vehicle wheels.

In still another example, the vehicle may be driven in an engine-off mode, herein also referred to as an electric mode, wherein motor 130 (such as a battery-powered electric motor) is operated and used as the only source of torque for driving wheels 170. As such, during the engine-off mode, no fuel may be injected into engine 110 irrespective of whether the engine is spinning or not. The "engine-off" mode may be employed, for example, when cruising at steady vehicle speed, during braking, light acceleration at low speeds, while stopped at traffic lights, etc. In this mode, only motor torque is used to propel the vehicle wheels.

Figure 2:
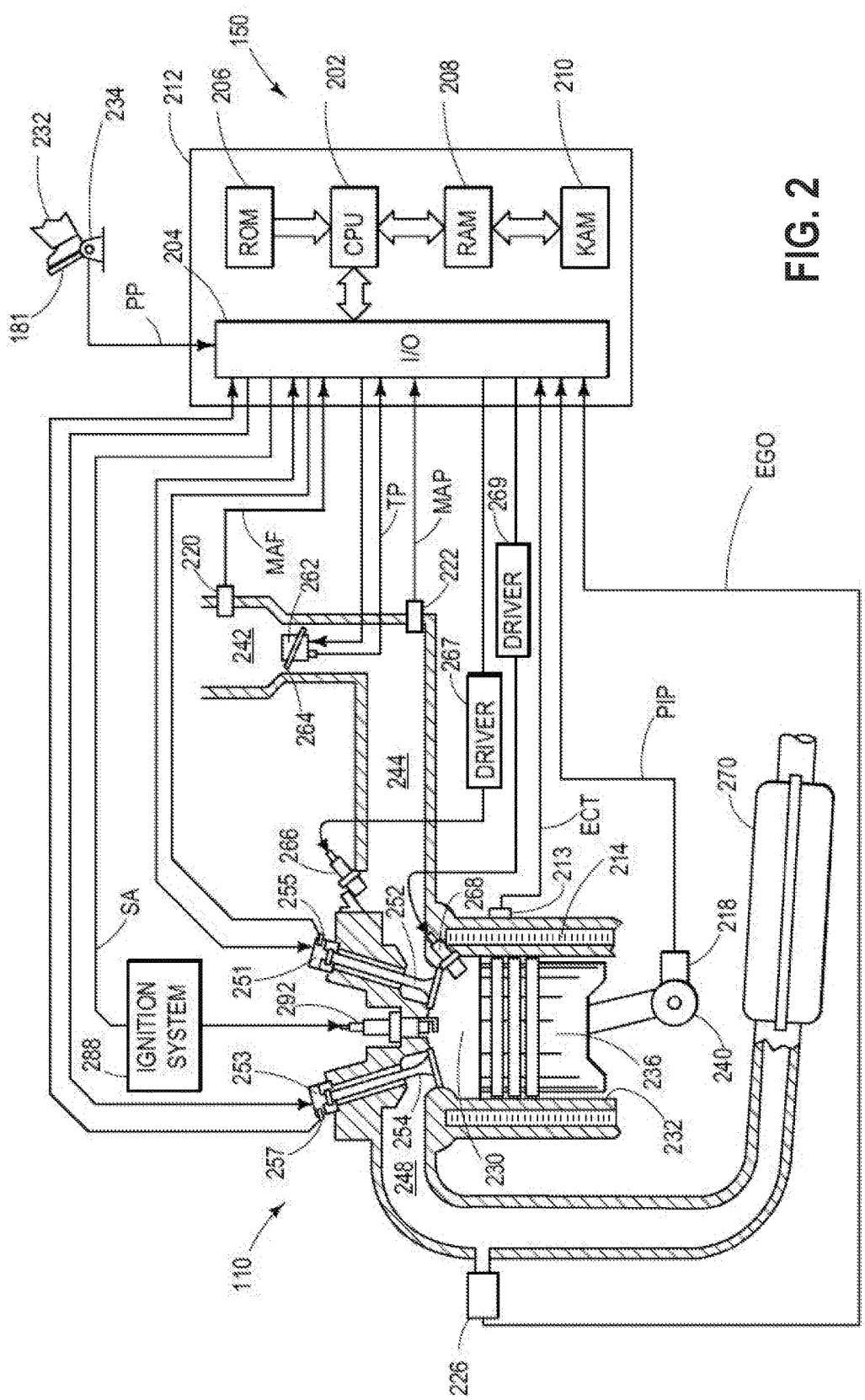
FIG. 2 shows a partial engine view.
Figure 3:
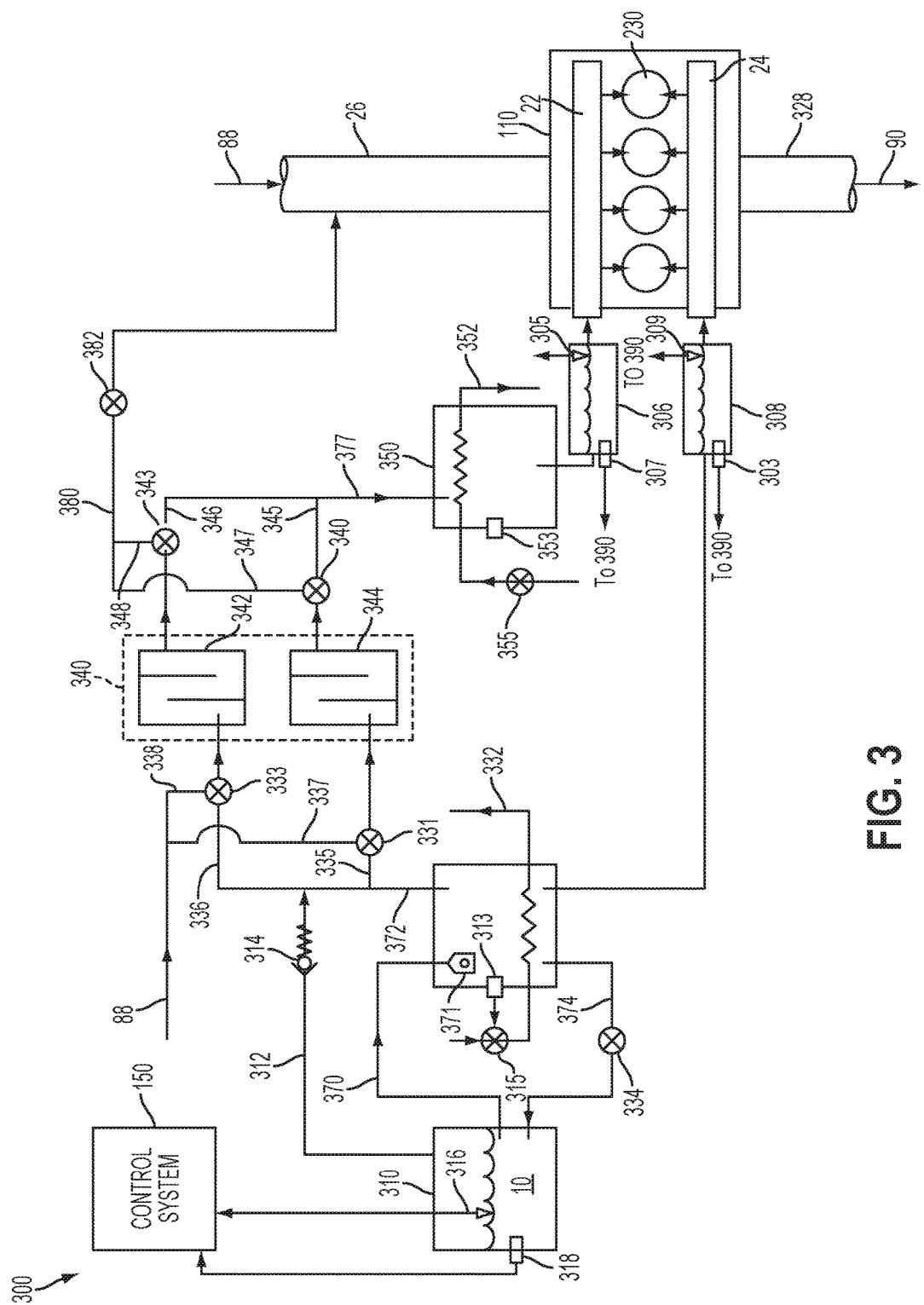
FIG. 3 shows an example embodiment of a fuel separator that may be used with a hybrid vehicle engine.

Propulsion system 100 may further include a control system 150 including a controller configured to receive information from a plurality of sensors (various examples of which are described herein and at FIGS. 2-3) and sending control signals to a plurality of actuators (various examples of which are described herein and at FIGS. 2-3). For example, control system 150 can receive an indication of the amount of the first substance stored in tank 122 from a sensor as indicated at 186 and can receive an indication of the amount of the second substance stored in tank 124 from a sensor as indicated at 188. Further, in some examples, control system 150 can receive an indication of the concentration of the second substance (e.g., a knock suppressing substance) contained within the first substance stored in tank 122 as indicated at 125. Control system 150 can also receive a user input signal from a user input device 181, which is shown in greater detail in FIG. 2. As one example, user input device 181 may include an accelerator pedal that is configured to enable a vehicle operator to control the acceleration and speed of the vehicle. Control system 150 can also receive various other inputs shown in FIG. 2 in addition to those shown in FIG. 1. The sensors may further include various pressure and temperature sensors, fuel level sensors, various exhaust gas sensors, and other sensors such as those described with reference to FIGS. 2-3.

The various actuators may include, for example, the CVT or hybrid transmission, cylinder fuel injectors, a fuel separator pump, an air intake throttle coupled to the engine intake manifold, and other actuators such as those described with reference to FIGS. 2-3. The control system 150 may receive input data from the various sensors, process the input data, and trigger the actuators in response to the processed input data based on instruction or code programmed therein corresponding to one or more routines. Example control routines are described herein with regard to FIGS. 4-5.

As one example, in response to the various inputs received by the control system, control system 150 can control the operation of transmission 160 and receive operation condition information from transmission 160 as indicated at 182. In one embodiment, transmission 160 comprises an electronically controlled transmission with a plurality of selectable speed ratios. Transmission 160 may also comprise various other gears, such as, for example, a final drive ratio (not shown). In the depicted example, transmission 160 is a continuously variable transmission (CVT). The CVT may be an automatic transmission that can change seamlessly through a continuous range of effective speed ratios, in contrast with other mechanical transmissions that offer a finite number of fixed gear ratios (speed ratios). The speed ratio flexibility of the CVT allows the input shaft to maintain a more optimized angular velocity. As elaborated with reference to FIGS. 4-5, by adjusting a speed ratio of the CVT, the vehicle control system 150 may be configured to vary an engine speed-load profile while maintaining a demanded power output of the engine. For example, an engine speed may be lowered while an engine load is correspondingly increased to maintain a power output by adjusting the CVT to a lower speed ratio. As another example, an engine speed may be raised while an engine load is correspondingly decreased to maintain a power output by adjusting the CVT to a higher speed ratio. This enables fuel economy benefits of operating an engine with a selected fuel to be better leveraged.

In other examples, in response to the various inputs received by the control system, control system 150 may vary a locking and/or unlocking schedule of a torque converter provided with the transmission. Control system 150 can also control the operation of engine 110 and receive operation condition information from engine 110 as indicated 184 and as further described with reference to FIG. 2. Control system 150 can also control the operation of motor 130 and/or energy storage device 140, and receive operating condition information from these devices as indicated at 180. Control system 150 can control the rate of separation provided by separator 173 as indicated at 175 and as further described with reference to FIG. 4. In addition to the various control paths shown in FIG. 1, control system 150 can control the operation of compressor 112, turbine 114, and the position of bypass valves 115 and 117. As one example, turbine 114 may be configured as a variable geometry turbine (VGT), whereby the geometry of the turbine may be controlled by control system 150 to vary the amount of boost provided to the engine by compressor 112.

Turning now to FIG. 2, an example cylinder view is shown. In one example, the depicted view is of cylinder 30 of engine 110 of the propulsion system 100 shown in FIG. 1. As shown in FIG. 1, engine 110 may be controlled by a control system 150. Control system 150 may include an electronic controller 212 configured to control the operation of engine 110 responsive to input received from a vehicle operator 232 via an input device 181. In this example, input device 181 includes an accelerator pedal and a pedal position sensor 234 for generating a proportional pedal position signal PP.

Combustion chamber (i.e. cylinder) 30 of engine 110 may include combustion chamber walls 232 with piston 236 positioned therein. Piston 236 may be coupled to crankshaft 240 so that reciprocating motion of the piston is translated into rotational motion of the crankshaft. Crankshaft 240 may be coupled to at least one drive wheel of a vehicle via an intermediate transmission system, for example, as shown in FIG. 1. Further, a starter motor may be coupled to crankshaft 240 via a flywheel to enable a starting operation of engine 110. As one non-limiting example, motor 130 shown in FIG. 1 may be operatively coupled to crankshaft 240 to enable torque to be exchanged between the engine and the motor.

Combustion chamber 230 can receive intake air from intake manifold 244 via intake passage 242 and can exhaust combustion gases via exhaust passage 248. As shown in FIG. 1, combustion chamber 230 can receive boosted intake air from ambient via a boosting device such as a compressor and can exhaust gases via exhaust passage 48 including a turbine. Alternatively, the compressor and/or turbine may be at least partially bypassed to enable at least one way in which the amount of boost provided to the cylinder may be varied. Intake manifold 244 and exhaust passage 248 can selectively communicate with combustion chamber 230 via respective intake valve 252 and exhaust valve 254. In some embodiments, combustion chamber 230 may include two or more intake valves and/or two or more exhaust valves.

As one non-limiting example, the position of intake valve 252 may be controlled by controller 212 via an electric or electromagnetic valve actuator (EVA) 251. Similarly, the position of exhaust valve 254 may be controlled by controller 212 via EVA 253. During some conditions, controller 212 may vary the signals provided to actuators 251 and 253 to control the opening and closing of the respective intake and exhaust valves. The position of intake valve 252 and exhaust valve 254 may be determined by valve position sensors 255 and 257, respectively. In alternative embodiments, one or more of the intake and exhaust valves may be actuated by one or more cams, and may utilize one or more of what may be referred to as cam profile switching (CPS), variable cam timing (VCT), variable valve timing (VVT) and/or variable valve lift (VVL) systems to vary valve operation. For example, cylinder 230 may alternatively include at least an intake or exhaust valve controlled via cam actuation including one or more of CPS, VCT, VVT, and/or VVL. Thus, it should be appreciated that engine 110 should not be limited to the various valve system configurations described herein by way of example.

Further, combustion chamber 230 may be configured with a first injector 266 and a second injector 268. The first injector may be configured to provide one of a first and a second substance to the combustion chamber (such as first substance 174 of FIG. 1) responsive to a signal supplied by a first electronic driver 267. The second injector may be configured to provide the other of the first and second substance to the combustion chamber (such as second substance 176 of FIG. 1) responsive to a signal supplied by a second electronic driver 269. As one non-limiting example shown in FIG. 2, the first injector 266 may be arranged along intake manifold 244 in a configuration that may be referred to as port injection and the second injector 268 may be coupled directly to combustion chamber 230 in a configuration that may be referred to as direct injection. However, it should be appreciated that in other examples, injector 266 may also be configured as a direct injector or injector 268 may also be configured as a port injector. Alternatively, a single direct injector may be utilized to provide varying relative amounts of first and second substances directly to the combustion chamber by way of a mixing valve arranged upstream of the injector. Thus, some or all of the cylinders of engine 110 may be configured to receive a fuel and/or other substance (e.g., a knock suppressing substance) in varying ratios depending on operating conditions.

As shown in FIG. 1, some or all of the cylinders of engine 110 can separately receive a first substance and a second substance in different relative amounts. For example, the first substance may include a fuel or fuel mixture including gasoline, diesel, or other suitable fuels, while the second substance may include a greater concentration of a knock suppressing substance than the first substance. For example, the second substance may include a greater concentration of alcohol or water than the first substance. In another example, the engine may be fueled with a fuel mixture which is then separated, by an on-board fuel separation system (elaborated at FIG. 3) that separates the fuel mixture into a first, higher octane fuel fraction and a second, lower octane fuel fraction, the first and second fuel fractions delivered to the engine in differing amounts by distinct injectors. Thus, in at least one embodiment, injector 266 may be configured to provide a first substance including gasoline to combustion chamber 30 via port injection and injector 268 may be configured to provide a second substance including a greater concentration of ethanol than the first substance to combustion chamber 30 via direct injection. In still other examples, a first and a second substance may be selectively provided to combustion chamber 30 in varying relative amounts via a single direct or port injector, for example, by utilizing a mixing valve arranged upstream of the single injector. Thus, it should be appreciated that the control system described herein may be configured to vary the absolute and/or relative amounts of a first substance (such as gasoline) and a second substance (such as ethanol) delivered to the combustion chamber responsive to operating conditions such as engine load, engine speed, engine output, or an indication of knock, a state of charge of an energy storage device of the hybrid vehicle the engine is coupled in, among others.

Intake passage 242 may include a throttle 262 having a throttle plate 264. In this particular example, the position of throttle plate 264 may be varied by controller 212 via a signal provided to an electric motor or actuator included with throttle 262, a configuration that may be referred to as electronic throttle control (ETC). In this manner, throttle 262 may be operated to vary the flow rate of intake air provided to combustion chamber 230 among other engine cylinders and the pressure within intake manifold 244. The position of throttle plate 264 may be provided to controller 212 by throttle position signal TP. It should be appreciated that the throttle may be arranged along the intake passage upstream or downstream of the compressor.

Intake manifold 242 may include a mass air flow sensor 220 and a manifold air pressure sensor 222 for providing respective signals MAF and MAP to controller 212. As one example, manifold air pressure sensor 222 may be arranged downstream of the compressor to enable the control system assess the level of boost provided by the boosting device.

Ignition system 288 can be operated to provide an ignition spark to combustion chamber 30 via spark plug 292 in response to spark advance signal SA from controller 212, under select operating conditions. Though spark ignition components are shown, in some embodiments, combustion chamber 230 or one or more other combustion chambers of engine 110 may be operated in a compression ignition mode, with or without an ignition spark.

Exhaust gas sensor 226 is shown coupled to exhaust passage 248 upstream of emission control device 270. Sensor 226 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 270 is shown arranged along exhaust passage 248 downstream of exhaust gas sensor 226. Emission control device 270 may include a three way catalyst (TWC), NOx trap, various other emission control devices, or combinations thereof. In some embodiments, during operation of engine 110, emission control device 270 may be periodically reset or purged by operating at least one cylinder of the engine within a particular air/fuel ratio range.

It will be appreciated that as described above, FIG. 2 shows only one cylinder of multi-cylinder engine 110, and that each cylinder may similarly include its own set of intake/exhaust valves, fuel injectors, spark plug, etc.

Controller 212 is shown in FIG. 2 as a microcomputer including microprocessor unit 202, input/output ports 204, an electronic storage medium for executable programs and calibration values shown as read-only memory chip 206 in this particular example, random access memory 208, keep alive memory 210, and a data bus. As described with reference to FIG. 1, control system 150 including controller 212 can exchange control signals with various components of the propulsion system. In addition to those previously described, controller 212 can send and receive various control signals including a measurement of inducted mass air flow (MAF) from mass air flow sensor 220; engine coolant temperature (ECT) from temperature sensor 213 coupled to cooling sleeve 214; a profile ignition pickup signal (PIP) from Hall effect sensor 218 (or other type) coupled to crankshaft 240; throttle position (TP) from a throttle position sensor; and absolute manifold pressure signal, MAP, from sensor 222. Engine speed signal, RPM, may be generated by controller 212 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 218, which is also used as an engine speed sensor, may produce a predetermined number of equally spaced pulses every revolution of the crankshaft.

Controller 212 receives signals from the various sensors of FIGS. 1-3 and employs the various actuators of FIGS. 1-3 to adjust vehicle operation (including engine and motor operation) based on the received signals and instructions stored on a memory of the controller. For example, the controller may adjust the CVT speed ratio and/or motor torque output based on a fuel fraction that is selected for engine fueling so as to operate the engine at a speed-load set-point that is most efficient for the given fuel fraction, while maintaining a power level of the vehicle. Non-transitory storage medium read-only memory 210 can be programmed with computer readable data representing instructions executable by processor 206 for performing the methods described below as well as other variants that are anticipated but not specifically listed.

It will be appreciated that while the examples disclosed herein are discussed with relation to a hybrid electric vehicle having an electrically actuated motor, this is not meant to be limiting, and the same approach may be applied to other hybrid vehicle systems such as those including a flywheel, hydraulic, and/or pneumatic motor. Likewise, any energy storage system may be used for providing motor torque, including but not limited to a system battery.

FIG. 3 shows an example fuel separation system 300 for separating a fuel mixture on-board a vehicle (such as the hybrid vehicle of FIG. 1). Fuel separation system 300 may be used to separate and deliver fuel to an engine of the hybrid vehicle. In one example, fuel separation system 300 is coupled to engine 110 in the hybrid vehicle system of FIGS. 1-2.

Fuel separation system 300 may include a fuel storage tank 310 which can be configured to store the liquid fuel mixture 10. Fuel storage tank 310 can include a fuel sensor 316 for providing an indication of the amount of fuel contained in fuel storage tank 310 to control system 150. Fuel storage tank 310 can also include a fuel sensor 318 for providing an indication of fuel composition to control system 150.

In this particular example, fuel storage tank 310 can communicate with engine 110 via a plurality of fuel paths. For example, evaporative vapor from the liquid fuel mixture stored in fuel storage tank 310 can proceed via fuel vapor passage 312 to a vapor separation system indicated at 340 where a hydrocarbon component can be removed from the fuel vapor by passing the evaporative vapors through one or more canisters 342 and 344, enabling the alcohol component to pass through vapor separation system 340. The hydrocarbon component can be removed from the fuel vapor by the canisters via adsorption of the hydrocarbons contained in the vapor onto an adsorption solid or other suitable material residing within the canisters. As one non-limiting example, to selectively strip gasoline components from the alcohols contained in the vapor, the vapors can be passed through the canisters including a bed of TENAX, carbon, or other suitable material, which has a low affinity for alcohols, but a high affinity for hydrocarbons and aromatics. The canisters can be periodically purged of their adsorbed components by exposing the canisters to a cooler gas, such as ambient air, which can cause the canisters to desorb the gasoline components. In an alternative embodiment, a selectively permeable fuel separation membrane may be used for separating components.

Fuel vapor passage 312 can include a unidirectional check valve shown schematically at 314 to reduce or inhibit the flow of fuel back into the fuel storage tank from passage 372. Fuel vapor passage 312 can be fluidly coupled with a fuel vapor formation region of the fuel storage tank, which may reside near an upper region (relative to the gravitational vector) of the storage volume defined by the fuel tank. In this way, fuel vapors originating from the fuel mixture during a re-fueling operation or during diurnal heating and cooling of the fuel mixture can be transferred to separation system 340, which is also configured to receive fuel vapors from evaporator 330.

The fuel mixture in a liquid state is provided to fuel evaporator 330 via a fuel passage 370, whereby evaporation or vaporization of the more volatile fraction of the fuel mixture may be performed by application of heat and/or a vacuum. Fuel passage 370 can include a check valve 371 to reduce or inhibit the flow of fuel back into the fuel storage tank from evaporator 330. Evaporator 330 can communicate thermally with a heat source such as engine coolant, engine exhaust, or an electric heater, which is shown schematically at 332. Heat transferred from the heat source to the evaporator can be used to heat the fuel mixture to a suitable temperature to facilitate vaporization or evaporation of the more volatile fraction of the fuel mixture, including at least the alcohol component.

A temperature of the evaporator can be controlled by varying an operating parameter of the heat source (e.g. temperature or thermal energy power output) and/or the rate of heat transfer between the heat source and the fuel mixture in order to maintain the fuel mixture at a temperature that is less than a temperature where the heavier hydrocarbons contained in the fuel mixture are readily vaporized. As one example, the rate of heat exchange between the heat source and the fuel mixture can be adjusted by varying the flow rate of a working fluid provided to evaporator 330 via passage 332. For example, a thermostat indicated generally at 313 can provide an indication of fuel mixture temperature to a valve 315 for controlling the flow rate of the working fluid within circuit 332.

The liquid portion of the fuel mixture including the less volatile hydrocarbon fraction of the fuel can be returned to the fuel storage tank via fuel passage 374. Fuel passage 374 can include a valve 334, which may be adjusted by the control system to regulate the flow of fuel returning to the fuel storage tank. In some examples, fuel passage 374 may include a heat exchanger for reducing the temperature of the liquid fuel before it is returned to the fuel tank. In this way, additional increase in fuel temperature at the fuel tank can be reduced in the case where fuel is returned to the tank. Furthermore, in some examples, the less volatile portion of the fuel mixture, including at least the heavier hydrocarbons can be provided to the engine via a fuel passage 376.

The more volatile vapor portion of the fuel mixture including at least the alcohol component and potentially some lighter hydrocarbons can be provided to separation system 340 via a fuel vapor passage 372, which is fluidly coupled with a vapor formation region of evaporator 330. Fuel passages 374 and/or 376 can communicate with a lower region of the fuel evaporator (e.g., via a drain) and fuel vapor passage 372 can communicate with an upper region of the fuel evaporator, thereby improving the separation of the heavier liquid phase of the fuel mixture from the lighter vapor phase of the fuel mixture. Additionally, a vacuum can be applied at the evaporator via vapor passage 372 from intake manifold 26 to further assist in the removal of more volatile fuel vapors from evaporator 330. As one example, an intake throttle of the engine can be adjusted to vary the pressure within the intake passage of the engine, thereby varying the vacuum applied to the evaporator via passage 372.

The vapor phase of the fuel mixture generated at evaporator 330 can be provided to separation system 340 via one or more vapor passages communicating with passage 372. In this particular example, separation system 340 includes two adsorption canisters 342 and 344 that can communicate with fuel vapor passage 372 via passages 2336 and 335, respectively. Air may be received from ambient as indicated at 88 and can be provided to passage 336 via air passage 338 and to passage 335 via air passage 337 for purging the canisters of stored hydrocarbons. A valve indicated at 333 can be adjusted by control system 150 to enable canister 342 to receive intake air via passage 338 or instead receive fuel vapors from the evaporator via passage 336. Similarly, a valve indicated at 331 can be adjusted by control system 150 to enable canister 344 to receive intake air via passage 337 or fuel vapor via passage 335. Valves 333 and 331 can include three-way valves or other suitable valves for enabling control system 150 to select which one of two flow paths are communicating with the adsorption canisters.

Depending on the positions of valves 343 and 341, canisters 342 and 344 can respectively communicate with condenser 350 via vapor passages 346 and 345, and can respectively communicate with purge passage 380 via vapor passages 348 and 347.

Alcohol vapors that pass through separation system 340 via one or more canisters (or other suitable separation system) can be provided to condenser 350 by way of vapor passage 377 communicating with passages 345 and 346. Condenser 350 can be configured to condense alcohol vapor received from the separation system to a liquid state. The alcohol in the liquid state can be provided to the engine via a fuel passage 379. As one example, condenser 350 can be configured to increase the pressure and/or temperature applied to the alcohol vapor in order to promote condensation. Condenser 350 can receive a working fluid via cooling circuit 352 having a lower temperature than the alcohol vapor received from the separation system. For example, the working fluid may include ambient air or a refrigerant utilized by the on-board air conditioning unit. As yet another example, a thermoelectric cooling device may be utilized to cool the alcohol vapor at the condenser. A thermostat 353 can provide an indication of the temperature of the alcohol within condenser 350 to a valve 355 that regulates the flow of the working fluid through cooling circuit 252. Vapor passage 377 can communicate with an upper region of condenser 350 and fuel passage 379 for receiving the liquid alcohol can communicate with a lower region of condenser 350 (e.g., a drain) to promote separation of the vapor and liquid phases of the alcohol.

In this way, the system of FIG. 3 enables a fuel mixture to be separated into a first fuel (an alcohol rich fuel) having a higher concentration of alcohol and a lower concentration of hydrocarbons than a second fuel (a hydrocarbon rich fuel). The first fuel including at least liquid alcohol can be provided to each of the engine cylinders via a first fuel injection system indicated generally at 22. The second fuel including at least the liquid hydrocarbons can be provided to the each of the engine cylinders via a second fuel injection system indicated generally at 24.

As one non-limiting example, fuel injection system 22 for the alcohol rich fuel may include an injector for each cylinder that is separate from an injector of fuel injection system 24 for the second fuel. However, in other examples, the alcohol rich fuel and the hydrocarbon rich fuel can be combined at a single injector by way of a mixing valve to enable a mixture of the alcohol rich fuel and the hydrocarbon rich fuel to be provided to the engine in varying ratios. Regardless of how the alcohol rich fuel and the hydrocarbon rich fuel are provided to the engine, these fuels can be combusted to generate mechanical work and products of the combustion can be exhaust from the engine via exhaust passage 328.

Fuel separation system 300 can include various fuel buffers to maintain a suitable supply of alcohol rich fuel and/or hydrocarbon rich fuel for use by the engine even during transient conditions. For example, a storage tank 306 may be provided along fuel passage 379 downstream of condenser 350 to store the alcohol rich fuel. Storage tank 306 may include a sensor 305 for providing an indication to control system 150 of the amount of alcohol rich fuel stored in tank 306. Tank 306 may also include a sensor 307 for providing an indication of the composition of the fuel stored in tank 306, including an indication of the concentration of alcohol in the alcohol rich fuel. In some examples, a storage tank 308 may be provided for the hydrocarbon rich fuel. Tank 308 can also include a sensor 309 for providing an indication of the amount of hydrocarbon rich fuel stored in tank 308 and/or a sensor 303 for providing an indication of the composition of the fuel stored in tank 308. In this way, the control system can identify the amount and/or composition of the alcohol rich fuel and the hydrocarbon rich fuel that are available to the engine. However, in some examples, storage tanks 306 and/or 308 may be omitted.

In response to an indication of a low availability of the alcohol rich fuel (e.g., when tank 306 is approaching an empty condition), for example, as provided by sensor 305, the control system can increase the rate of evaporation at evaporator 330, separation at separator 340, and/or condensation at condenser 350 to increase the separation rate of the alcohol fuel component from the hydrocarbon fuel component. Similarly, in response to an indication of a greater availability of the alcohol rich fuel (e.g., when tank 306 is approaching a full condition), the rate of evaporation, separation, and/or condensation may be reduced. The rate of fuel vapor generation can be increased by increasing the flow rate of the mixed fuel to the evaporator and/or by increasing the amount of heat provided to the evaporator via heating circuit 332. The rate of fuel vapor generation can be reduced by reducing the flow rate of the mixed fuel to the evaporator and/or by reducing the amount of heat provided to the evaporator via heating circuit 332. Similarly, the rate of condensation of the alcohol fraction can be increased or decreased by adjusting the flow rate of coolant flowing through condenser 350 via cooling circuit 352.

As yet another example, the control system can monitor the usage rate of each fuel type (e.g., via changes in fuel storage amount and/or fuel injector pulse width and injection frequency) and can adjust the processing rate (e.g., evaporation, separation, and condensation) of the fuel mixture accordingly to ensure that a sufficient amount of each fuel component is available to the engine.

As still another example, when the control system identifies that the fuel contained in fuel tank 310 includes an insufficient concentration of alcohol, for purposes of separating the fuel components, the control system may reduce or discontinue the various operations at evaporator 330, vapor separator 340, and/or condenser 350. For example, where the fuel contained in fuel tank 310 includes pure gasoline, the control system may shut-off evaporator 330 and condenser 350 to conserve energy. In this case, the fuel can be provided directly to the engine by way of passages 301 and 376, thereby bypassing the evaporator, separator, and/or condenser.

The control system can also effectuate increases or decreases in fuel flow rate, the flow rate of the working fluid flowing through circuit 332, and the flow rate of the working fluid flowing through circuit 352 by adjusting the operation of intermediate valves and/or pumps not shown in FIG. 2. For example, fuel passage 370 may include a fuel pump that is controllable by control system 150. As another example, fuel passages 376 and 379 can include fuel pumps for providing sufficient fuel pressure to the fuel injection systems. By increasing the pump work and/or pressure increase, the flow rate of fuel to the evaporator can be increased. By opening valve 332 or increasing the pump work provided to heating circuit 332, the flow rate of the working fluid may be increased. In this way, the control system can adjust various parameters of the fuel delivery system to meet the particular fuel consumption rate of the engine.

As elaborated herein, by integrating the fuel separation system into a hybrid vehicle system, the higher power motor of the hybrid vehicle can be leveraged for meeting the electrical load of the fuel separation system while also meeting the varying electrical loads and demands of the vehicle. In addition, by driving the fuel separator system directly via a motor of the hybrid vehicle while the engine is running (that is, with the engine generating torque to meet propulsion, and excess torque over the amount needed for propulsion to drive the fuel separator via the motor/generator, and without charging a battery), parasitic losses associated with battery charging/discharging cycles are reduced. In this way, additional synergistic fuel economy benefits are achieved.

In this way, a portion of an initial fuel mixture having a higher volatility (e.g. higher vapor pressure) can be evaporated or vaporized by the application of heat to the fuel mixture and/or a partial vacuum at the vapor formation region or free surface of the liquid fuel mixture. An alcohol component of the more volatile vaporized portion of the fuel mixture can be separated from a hydrocarbon component by way of selective adsorption of the hydrocarbon component onto a solid or by way of a selective membrane that permits a greater transfer of the alcohol component than the hydrocarbon component of the fuel vapor. This allows an alcohol rich fuel can be separated from the fuel mixture, where it can be provided to the engine in varying amounts relative to the remaining hydrocarbon rich fuel.

A liquid phase of the fuel mixture can be provided to an evaporation or vaporization stage to separate a higher volatility vapor fraction (e.g. having a higher vapor pressure) from a lower volatility liquid fraction (e.g., having a lower vapor pressure). The lower volatility liquid fraction that is separated from the higher volatility vapor fraction can have a higher octane rating than the original fuel mixture, where the lighter ends of the hydrocarbon component of the fuel mixture comprises at least a portion of the separated higher volatility vapor fraction.

Separation of the fuel mixture may include heating the fuel mixture to separate the higher volatility fraction including at least alcohol and/or hydrocarbon component having a lower boiling temperature (e.g., higher vapor pressure) and/or higher evaporation rate from the lower volatility fraction including hydrocarbons having a higher boiling temperature (e.g., lower vapor pressure) and/or lower evaporation rate. For example, in addition to the alcohol vapors that are separated from the fuel mixture by evaporation or vaporization, the more volatile portion of gasoline may provide a mixture of vapors including butane, pentane, hexanes, and the aromatics such as benzene, toluene, and xylenes. Therefore, it should be appreciated that the more volatile fraction of fuel mixture may include some hydrocarbon vapors in addition to alcohol vapors. Furthermore, in some examples, a partial vacuum may be applied at the vapor formation region of the fuel mixture in order to increase the rate of evaporation of the more volatile fraction from the fuel mixture. The partial vacuum can be provided by a passage communicating with an air intake passage of the engine at a reduced area region of the intake passage or downstream of an intake throttle.

Next, the more volatile fraction of the fuel mixture indicated can undergo additional separation by adsorbing the hydrocarbon component at a solid contained within an adsorption canister while permitting the alcohol component to pass through the canister without being adsorbed. As another non-limiting example, a selectively permeable membrane can be subjected to the more volatile fuel vapor fraction, whereby the membrane permits an exclusive or more rapid transport of the alcohol component through the membrane than the hydrocarbon component. Additionally, evaporative vapors that originate from the initial fuel mixture can also undergo separation without necessarily passing through the evaporation or vaporization process.

The hydrocarbon rich component of the more volatile fraction of the fuel mixture can be provided to the engine in a vapor phase or can be condensed to obtain a liquid phase. The alcohol rich component of the more volatile fraction of the fuel mixture can also be condensed into a liquid phase and provided to the engine. In each condensation process, fuel vapor can be condensed to a liquid phase by increasing the temperature and/or pressure of the vapor.

In this way, the system of FIGS. 1-3 enables a hybrid vehicle system, comprising: an engine coupled to vehicle wheels; an electric motor coupled to the vehicle wheels, the electric motor also coupled to a battery; a fuel separator driven by another electric motor coupled to the battery, the separator separating a fuel into high-octane and low-octane fractions; a first fuel injector for delivering the high-octane fraction from a first fuel tank into the engine; a second fuel injector for delivering the low-octane fraction from a second fuel tank into the engine; a continuously variable transmission (CVT); and a controller. The controller may be configured with computer readable instructions stored on non-transitory memory for: transferring engine output to the motor and supplying electric power from the motor to the electric fuel separator without said supplied power being stored in a battery; separating the fuel into high-octane and low-octane fractions; when injecting the high-octane fuel into the engine, adjusting a speed ratio of the CVT to operate the engine at a first adjusted speed-load profile having a lower engine speed and a higher engine load for a given power level; and when injecting the low-octane fuel into the engine, adjusting the speed ratio of the CVT to operate the engine at a second adjusted speed-load profile having a higher engine speed and a lower engine load for the given power level. The controller may include further instructions for: in response to a regenerative braking event, increasing an output of the fuel separator, the output including one of a speed and a pressure of fuel separation; and in response to a lower than threshold engine load, increasing the output of the fuel separator, wherein the increasing responsive to the regenerative braking event is larger than the increasing responsive to the lower than threshold engine load.

Figure 4:
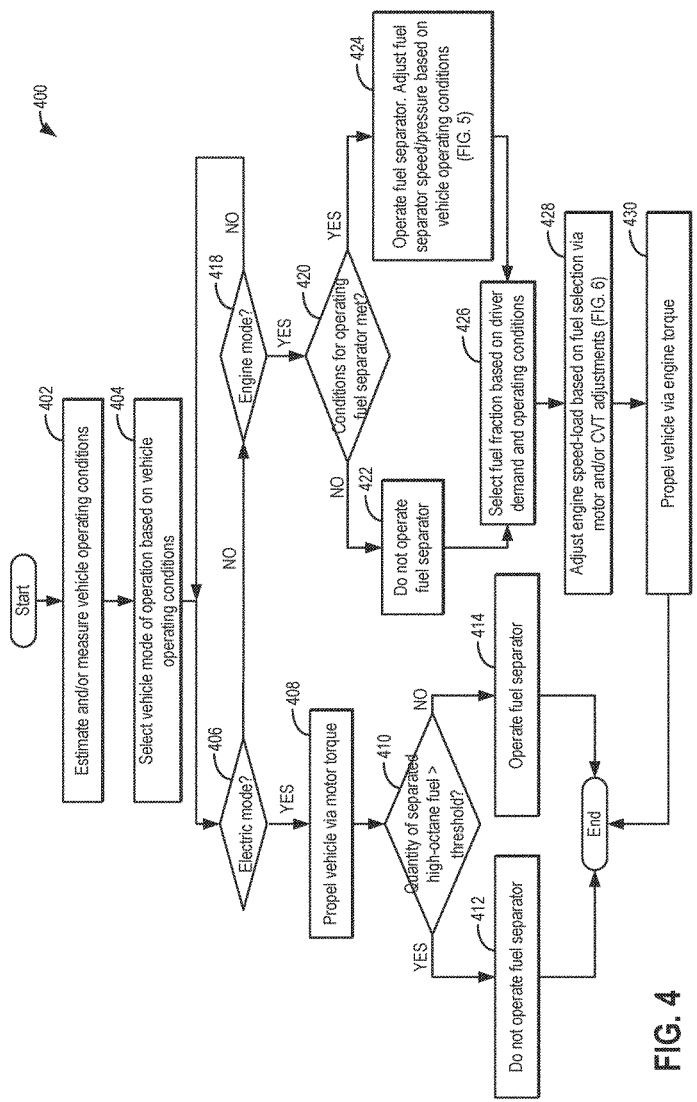
FIG. 4 shows a high level flow chart for coordinating operation of an electric fuel separator on-board a hybrid vehicle system.

Now turning to FIG. 4, an example routine 400 is described for coordinating adjustments of fuel separation and fuel usage at an engine with motor operation and/or CVT adjustments in a hybrid vehicle system. The method enables a more reliable and economical fuel separation despite changes in driver torque demand and changes in vehicle electrical load. In addition, the method enables the engine of the hybrid vehicle to be operated in a more optimized manner on a selected fuel by leveraging synergies between engine fuel usage and motor usage in the hybrid vehicle. Instructions for carrying out method 400 as well the other methods included herein may be executed by a controller based on instructions stored on a memory of the controller and in conjunction with signals received from sensors of the engine system, such as the sensors described above with reference to FIGS. 1-3. The controller may employ engine actuators of the engine system to adjust engine operation, according to the methods described below.

At 402, the routine includes estimating and/or measuring vehicle operating conditions. These may include, for example, driver torque demand (such as based on output of a pedal position sensor coupled to an operator pedal), ambient temperature, pressure and humidity, engine temperature, battery state of charge, fuel level in a fuel tank, fuel octane of available fuel(s), etc. In addition, engine operating conditions such as manifold pressure (MAP), manifold air flow (MAF), engine temperature, catalyst temperature, intake temperature, knock limits, etc., may be estimated.

At 404, the method includes determining a vehicle mode of operation based on the estimated vehicle operating conditions. This includes shifting between propelling the vehicle using motor torque and engine torque responsive to the engine operating conditions, including the driver demand. For example, an electric mode of operation may be selected when the torque demand is lower, when a fuel level in the fuel tank (of the unseparated fuel or a specific fuel fraction) is lower, and/or when the battery state of charge is higher. In the electric mode, the vehicle wheels may be propelled only via motor torque from an electric motor that is powered by a system battery. As another example, an engine mode of operation may be selected when the torque demand is higher, when the fuel level in the fuel tank (of the unseparated fuel or a specific fuel fraction) is higher, and/or when the battery state of charge is lower. In the engine mode, the vehicle wheels may be propelled only via engine torque from an engine. Further still, an assist mode (not depicted) may be selected if the torque is higher than a level that can be provided via only engine torque. Therein, the vehicle wheels may be propelled via each of motor torque and engine torque.

At 406, it may be confirmed if the electric mode was selected. If yes, then at 408, the method includes propelling the vehicle via motor torque. In particular, the motor may be spun using energy from an energy storage device, such as a system battery, and motor torque may be transmitted to vehicle wheels. At 410, the method includes estimating the available quantity of high octane fuel (or fuel fraction) and comparing it to a threshold. As such, the high octane fuel may have been separated from the fuel refilled in the fuel tank via the fuel separator and stored in a separate buffer tank. For example, the vehicle fuel tank may be refilled with a gasoline-ethanol blend such as E85 and the fuel may be separated into a higher octane ethanol fuel fraction and a lower octane gasoline fuel fraction. If the available quantity of high octane fuel is higher than the threshold, then at 412, the method includes not operating the electric fuel separator. In this way, the electrical load on the vehicle is reduced and the fuel separator is not operated when sufficient high octane fuel is available. Else, if the available quantity of fuel is lower than the threshold, then at 414, the method includes operating the electric fuel separator when possible. In one example, the fuel separator may be operated while the vehicle is propelled via the motor torque.

If an electric mode is not confirmed, at 418, it may be confirmed if the engine mode was selected. If yes, then at 420, it may be determined if conditions for operating the electric fuel separator are met. If fuel separation conditions are not met, at 422, the fuel separator may not be operated. In one example, fuel separation may not be required if the quantity of high octane fuel available in the buffer tank is higher than a threshold level. As another example, the fuel separator may not be operated during conditions of higher electrical load/demand on the engine. If fuel separation conditions are met, at 424, the fuel separator may be operated. In particular, sufficient engine output may be generated to propel the vehicle and run the fuel separator via the motor/generator of the hybrid system. For example, the controller may use engine output to propel the vehicle. Concurrently, the controller may transfer engine output to the motor/generator, and supply electric power from the motor/generator to the electric fuel separator without said supplied power required to operate the separator being stored in a system battery. Then, fuel may be separated into higher octane and lower octane fuel fraction at the separator. It will be appreciated, however, that if the engine output is higher (than requested wheel torque) such that the electric power supplied is higher than the power required to operate the fuel separator, then the portion of electric power required to operate the fuel separator is not stored in the battery (but used to operate the fuel separator while bypass the battery) while the remaining excess electric power is stored in the battery. As an example, if the generator generates 5 kW of power in excess of what is required to propel the vehicle wheels, and the fuel separator uses 2 kW, then 3 kW of excess power is stored in the battery. By operating the fuel separator directly via the generator, efficiency losses associated with battery charging/discharging are reduced. It will be appreciated that the fuel separator being operated directly includes the battery being bypassed. As such, the fuel separator may receive electrical power from the generator via one or more intermediate electrical devices, such as an inverter for converting the AC power of the generator to DC power for the separator. As elaborated with reference to FIG. 5, the fuel separator may be operated during engine operation when the electrical load on the engine is not high and/or when excess electrical energy is available at low incremental fuel cost. For example, the electrical fuel separator may be operated while the engine is running during regenerative braking, or when the electrical load on the engine is low. As also elaborated at FIG. 5, fuel separator output (e.g., pressure or speed) may be adjusted via adjustments to an electric pump pumping fuel through the separator. For example, the fuel separator output may be opportunistically increased (or maximized), whenever possible.

From each of 422 and 424, the method moves to 426 wherein a fuel fraction is selected for use in the engine based on driver demand and operating conditions. As elaborated earlier, fuel in the fuel tank may be separated at the electric separator into a high octane and a low octane fraction. For example, an ethanol-gasoline fuel blend may be separated into a higher octane ethanol fraction and a lower octane gasoline fraction. The engine controller may select one or more of the higher octane and lower octane fractions for delivering into and combusting in the engine. As an example, use of the higher octane fraction may be increased when the engine is more knock limited. As an example, use of the lower octane fraction may be increased at lower loads, and when the engine is less knock limited.

At 428, engine operation may be adjusted so as to maintain the engine speed-load in a range that is optimal for fuel separator efficiency. For example, the controller may operate the engine at an adjusted speed-load while separating the fuel, the adjusted speed-load based on the availability of at least the higher octane fuel fraction, and further based on usage of the higher octane fuel fraction. As elaborated with reference to FIG. 6, the hybrid vehicle may include a CVT transmission coupled to the engine, between the engine and the vehicle wheels, and the controller may select a CVT speed ratio that delivers the speed to match the requested adjusted speed-load. Alternatively, a rate of battery charging/discharging via the electric motor of the hybrid vehicle may be varied to adjust the engine power for a given driver demanded wheel power, so as to adjust the engine load independent of the engine speed. For example if the engine torque is reduced to eliminate knock, the engine speed does not have to be increased, because the battery is adding power. At 430, the vehicle may be propelled with engine torque which is provided by combusting one or more of the separated fuel fractions in the engine cylinders.

In this way, a fuel separator may be integrated with a hybrid vehicle, including a mild hybrid, hybrid electric vehicles, as well as hydraulic or flywheel hybrids. In doing so, the higher-voltage electrical system of the hybrid can be used for fuel separation, which improves the efficiency of the electrically driven fuel separator. For example, fuel separator systems may offer a net fuel economy benefit with a conventional 12V vehicle architecture. However, the benefits may be substantially increased with a higher-voltage system of the hybrid electric vehicle (such as one with a 48V or higher architecture) where parasitic losses are minimized.

Figure 5:
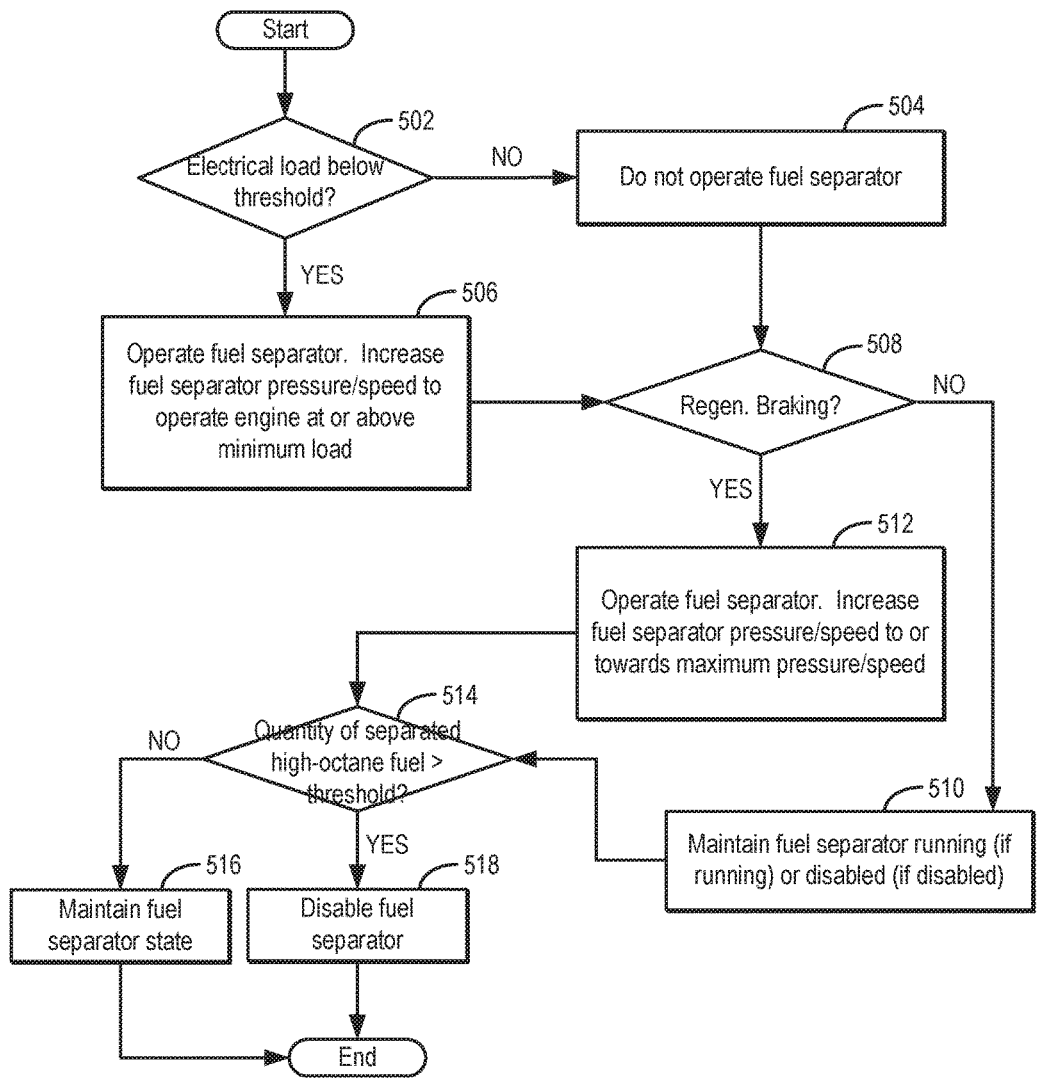
FIG. 5 shows a high level flow chart for adjusting an output of the electric fuel separator based on engine operating conditions.

Turning now to FIG. 5, method 500 depicts an example routine 500 for adjusting fuel separator output based on engine conditions. The method enables generation and usage of a high octane fuel fraction to be increased, and thereby fuel economy to be improved. As such, the method of FIG. 5 may be performed while the engine is running and the output of the engine is being used to propel the vehicle and operate the hybrid vehicle motor to drive the fuel separator.

At 502, it may be determined if the engine is operating with electrical load below a threshold (such as below a lower threshold). Alternatively, it may be determined if the engine is operating with low engine load (or low power). For example, it may be determined if the electrical load of the engine is less than a minimum engine load. In one example, the electrical load of the engine may be low when passenger heating or cooling is requested. If the engine load is above the threshold, then at 504, the method includes disabling the fuel separator so as not to add additional electrical load onto the engine. By disabling the fuel separator during high engine load conditions, the fuel separator is not operated during conditions where the operation is not reliable, such as when there may be inefficient high currents at the fuel separator.

In some examples, in addition to determining if the engine load is low, it may be further determined if the quantity of separated high octane fuel is higher than a threshold (that is, if sufficient fuel separation has occurred). Responsive to lower than threshold engine load while availability of the higher octane fraction is above a threshold level, the controller may shut down the engine and disable the fuel separator. In addition, the controller may transition to propelling the vehicle using motor torque from the motor/generator.

If the engine load is low, then at 506, the method includes operating the fuel separator. In addition, the fuel separator may be operated and an output of the separator (such as a speed or pressure of an electric pump of the separator) may be increased when the engine is running at low power so that the added electrical load of the fuel separator improves engine efficiency. In one example, responsive to lower than threshold engine load, and additionally while availability of the higher octane fuel is lower than the threshold level, the controller may increase the output of the fuel separator to raise the engine load above the threshold load. As such, when operating at or below the threshold load (e.g., at a minimum engine load), engine efficiency may be low. This may be due to the need to operate with more spark retard. Herein, by increasing the fuel separator output at the low engine load condition, in addition to increasing the availability of the high octane fuel, the electrical load on the engine may be increased, enabling the engine to be operated with less spark retard. In this way, the fuel economy of the engine is improved. In addition, the increased availability of the high octane fuel prompts increased usage of the high octane fuel, resulting in knock mitigation and further fuel economy benefits. Increasing the output of the fuel separator may include one or more of increasing a separator pump pressure and a speed of fuel separation. In one example, the fuel separator output may be increased to or towards a maximum output. A degree of increasing the fuel separator output may be based on the electrical load of the engine, the degree of increasing raised as a difference between the engine load and a minimum engine load increases. In another example, the degree of raising engine load may be based on the availability of the higher octane fuel fraction relative to the threshold level. The engine may be operated with the raised load until the availability of the higher octane fuel fraction is above the threshold level. As such, while separating the fuel, the routine may further include injecting one or more of the higher octane and lower octane fractions into the engine (for example, by actuating corresponding injectors) and increasing usage of the higher octane fraction responsive to the raised engine load.

It will be appreciated that in response to a rate of usage of the higher octane fraction at the raised engine load exceeding a fuel separation rate with the electrical power from the generator, the controller may reduce the output of the fuel separator to lower the engine load. For example, the separator output may be reduced to resume the original engine load (at or above the threshold load). From each of 504 and 506, the method moves to 508 wherein it is determined if a regenerative braking event is occurring. In one example, regenerative braking may occur during a vehicle deceleration event wherein the electric motor of the hybrid vehicle is operated as a generator using wheel torque. If regenerative braking is not confirmed, then at 510, the fuel separator may be maintained running if it was running, or disabled if it was not running. If regenerative braking is confirmed, at 512, the fuel separator may be operated with the output (such as a speed or pressure of an electric pump of the separator) increased to or towards a maximum output. Specifically, in response to the regenerative braking event, the method includes transferring wheel torque to the generator and supplying electric power form the motor/generator to the fuel separator to increase the fuel separator output. In one example, all the wheel torque may be transferred to the motor/generator and thereon to the fuel separator without storing the supplied electric power in a system battery. In an alternate example, a larger portion of the wheel torque received at the motor/generator may be used to increase the output of the fuel separator while a remaining smaller portion of the wheel torque received at the motor is used to charge the battery. A degree of increasing the fuel separator output may be based on an amount of excess electrical energy generated at the regenerative braking event (that is, the amount of charge that would have otherwise been delivered to a system battery during the event). The degree of increasing may be raised as the amount of excess electrical energy generated at the braking event increases. In this way, by increasing fuel separator output during regenerative braking, the fuel separator can be run when excess electrical energy is available at low incremental fuel cost.

At 514, it may be determined if a sufficient amount of fuel has already been separated. For example, it may be determined if the quantity of high-octane fuel fraction in the buffer tank is higher than a threshold amount. If a threshold amount of fuel has already been separated, the fuel separator may be disabled and further fuel separation may be discontinued at 518. Else at 516, the fuel separator state may be maintained. For example, the fuel separator may continue to be operated with the increased output.

In this way, if the engine is at an inefficient condition such as low engine load, then better fuel economy may be achieved by increasing the engine load to generate power for the separator. Consequently, it may be more efficient to run the separator when there is a greater opportunity to improve engine efficiency, such as by increasing engine load from lower to higher via the electrical load of the separator, as opposed to when the engine is already running efficiently, at which time turning on the fuel separator will not increase the engine efficiency.

Figure 6:
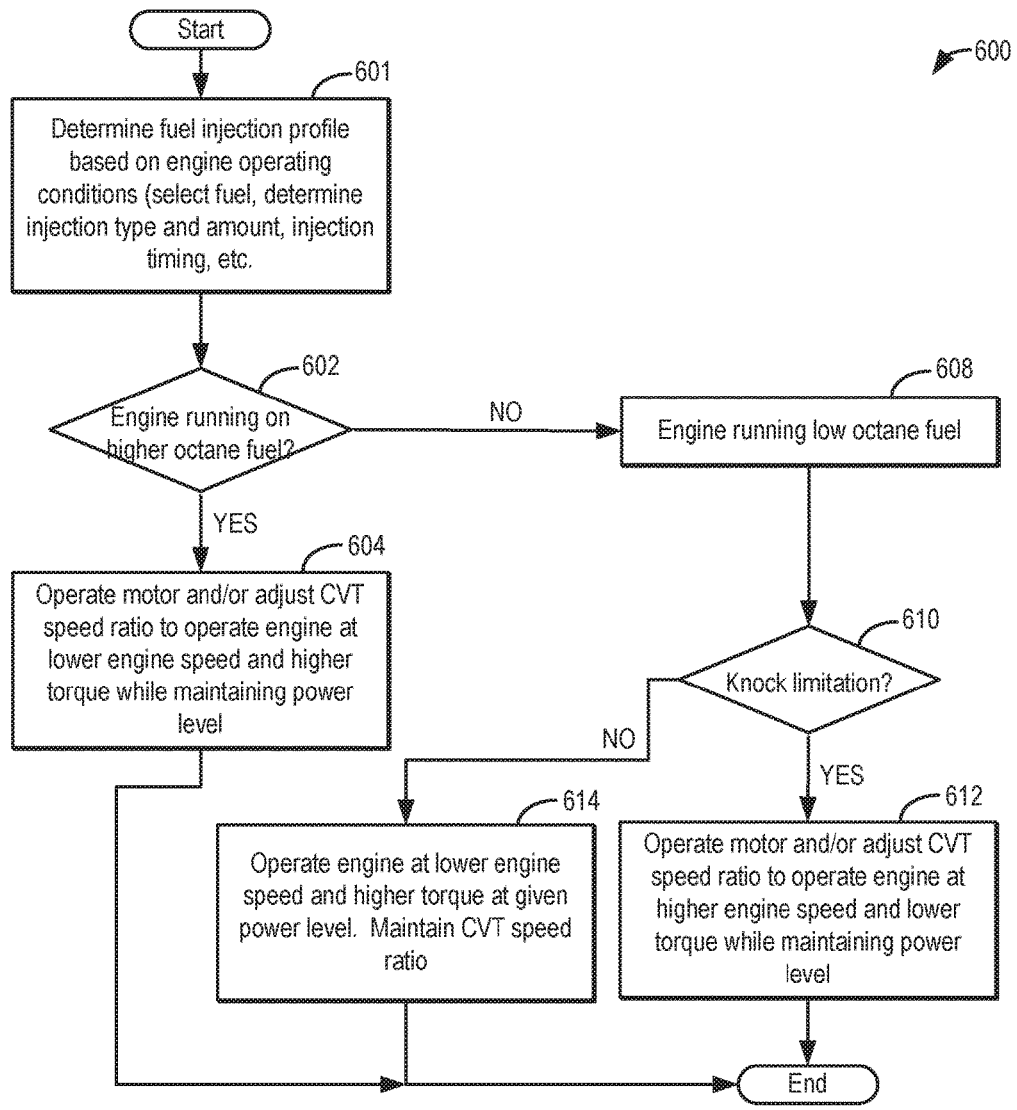
FIG. 6 shows a high level flow chart for coordinating engine speed-load adjustments affected via a CVT and/or motor torque with fuel separation and fuel usage adjustments to improve the fuel economy of a hybrid electric vehicle.
Figure 7:
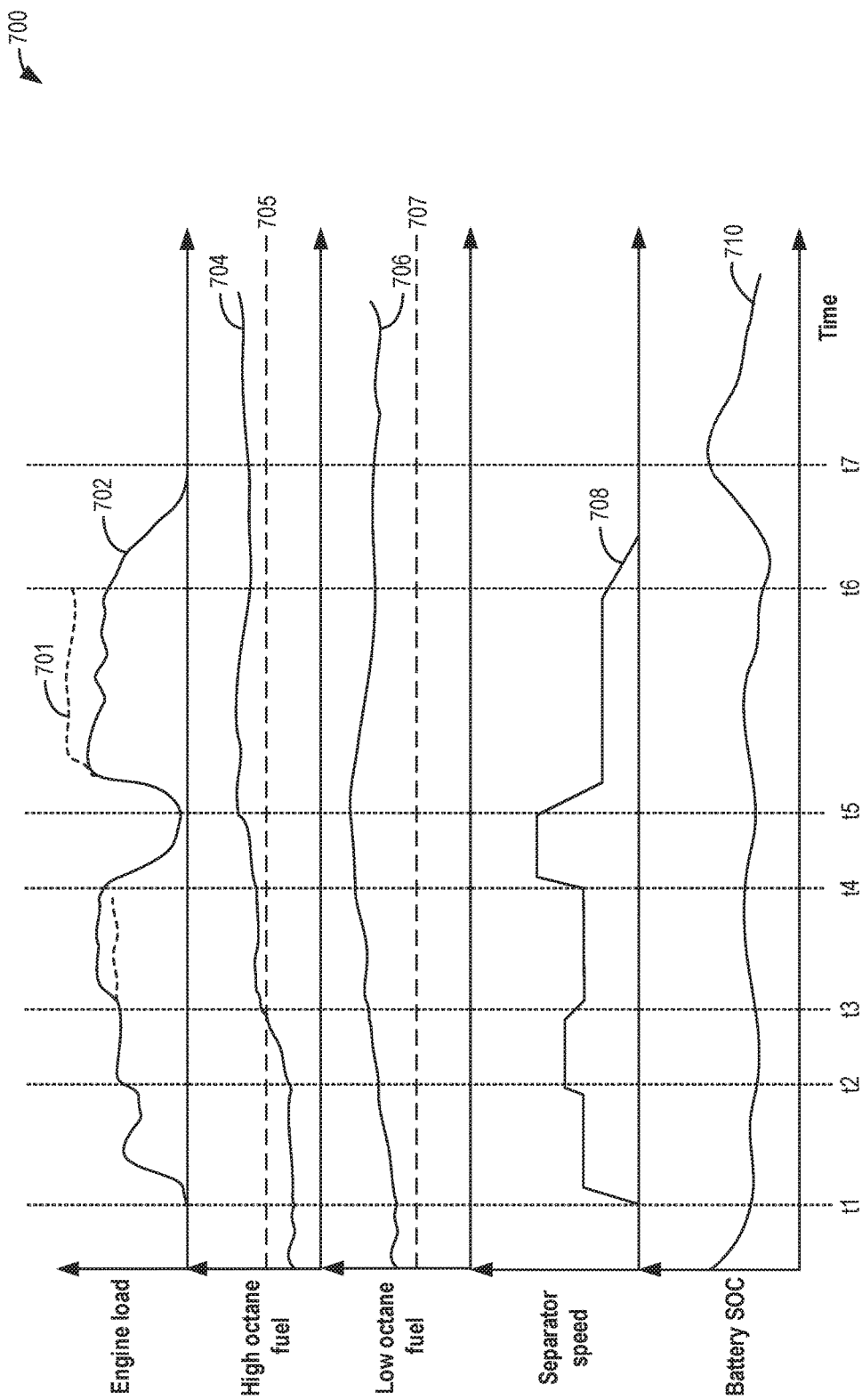
FIG. 7 shows example fuel separation and fuel usage adjustments during operation of a hybrid vehicle.

Turning now to FIG. 6, an example method 600 is shown for adjusting an engine speed-load profile during fuel separator operation to improve engine efficiency while maintaining a power level of a hybrid vehicle. The method enables engine operation to be held in a narrow range where the fuel separator operation and usage of a selected fuel fraction is efficient, even as driver demand changes. The steps of method 600 may be performed as part of the routine of FIG. 4, such as at 428. It will be appreciated that the steps of method 600 may be performed while an electric fuel separator is enabled and separating a liquid fuel into a higher octane and a lower octane fuel fraction.

At 601, based on engine operating conditions, a fuel injection profile may be determined including selecting a separated fuel fraction for injection, and determining an amount of fuel to be injected, a type of injection (e.g., direct or port injection), and a fuel injection timing. Still other injection parameters may be determined. In one example, the higher octane fuel may be used at lower engine loads while the lower octane fuel may be used at higher engine loads. In another example, the higher octane fuel may be used when the engine is operating closer to knock limits. In still another example, fuel usage may be determined based on fuel availability, with the higher octane fuel being selected for use if availability of the higher octane fuel is higher than a threshold level. Else if the availability of the higher octane fuel is lower than the threshold level, the lower octane fuel may be selected for injection.

At 602, it may be determined if the engine is running on the higher octane fuel. If yes, then at 604, the method includes adjusting a target engine speed-load profile of the engine via adjustments to the electric motor of the hybrid vehicle and/or the CVT speed ratio to operate the engine at a lower engine speed and higher torque while maintaining the power level. By running at the lower engine speed and the higher torque, the greater knock resistance and higher efficiency of the higher octane fuel can be leveraged for further improvements in fuel economy.

If the engine is not running on the higher octane fuel, then at 608, the method infers that the engine is running on the lower octane fuel. At 610, while running on the lower octane fuel, it may be determined if there are any knock limitations.

For example, it may be determined if a knock output of a knock sensor is higher than a knock threshold. As another example, it may be determined if the engine's propensity for knock while operating with the lower octane fuel is higher. If yes, then at 612, the method includes adjusting the target engine speed-load profile of the engine via adjustments to the electric motor of the hybrid vehicle and/or the CVT speed ratio to operate the engine at a higher engine speed and lower torque while maintaining the power level. By shifting to the higher speed and lower torque, the need for excessive spark retard due to knock is reduced. While the engine efficiency at this condition may not be as high as engine operation with the higher octane fuel, the efficiency penalty of the lower-octane fuel is minimized by taking advantage of the hybrid vehicle system's ability to control engine speed-load with the CVT functionality. If the engine is not knock limited, then at 614, the existing CVT speed ratio is maintained and the engine is operated at the lower speed and higher torque at the given power level. In this way, a hybrid vehicle's electric components can be leveraged to "schedule" the engine to operate at different speed-load points depending on which fuel is being used.

In this way, a hybrid vehicle controller may operate an engine to propel the vehicle and spin an electric motor without charging a battery coupled to the motor, the motor also coupled to vehicle wheels; separate a liquid fuel onboard the vehicle into high-octane and low-octane fuel fractions at an electric fuel separator driven by the spinning motor; and select one of the high-octane and low-octane fuel fractions for injection into the engine. Herein, operating the engine while separating the fuel may include operating the engine at an adjusted engine speed-load, the adjusted engine speed-load based on the selecting and further based on an available amount of the high-octane fuel fraction. In one example, the vehicle may include a continuously variable transmission coupled between the engine and vehicle wheels, wherein operating the engine at the adjusted engine speed-load includes selecting a CVT speed ratio matching the adjusted engine speed-load. The adjusted engine speed-load may include a higher speed and lower load when the low-octane fraction is selected for injection into the engine, the higher speed raised as an indication of engine knock increases. The adjusted engine speed-load may include a lower speed and a higher load when the high-octane fraction is selected for injection into the engine. Further, in response to a regenerative braking event, the controller may brake vehicle wheels by transferring wheel torque to the motor, a larger portion of the wheel torque received at the motor used to increase an output of the fuel separator, a smaller, remaining portion of the wheel torque received at the motor used to charge the battery. Furthermore, responsive to a drop in engine load below a threshold load, the controller may increase an output of the fuel separator to maintain the engine load above the threshold load, and increase usage of at least the high-octane fraction.

Turning now to FIG. 7, example adjustments to an engine and fuel separator operation in a hybrid vehicle are shown. Map 700 depicts engine load at plot 702, high octane separated fuel usage at plot 704, low octane separated fuel usage at plot 706, separator speed at plot 708, and a battery state of charge at plot 710. All plots are shown over time along the x-axis.

Prior to t1, the vehicle is operated in an electric mode with the vehicle propelled using only motor torque from an electric motor. Accordingly, the state of charge of a battery coupled to the motor drops as motor torque is used. The fuel separator is not operated at this time. A quantity of high octane fuel available in the buffer tank is below threshold 705 while the quantity of low octane fuel available in the buffer tank is below threshold 707.

At t1, responsive to a rise in driver demand, the vehicle is shifted to the engine mode and the engine is restarted. Engine torque is then used to propel the vehicle. In addition, engine torque is transferred to the electric motor to drive the fuel separator so that a liquid fuel in the fuel tank can be separated into high octane and low octane fuels. Due to the availability of more low octane fuel, low octane fuel usage in the engine is increased.

At t2, due to a change in driver demand, the engine load may drop to a threshold load, such as a minimum engine load. As such, engine efficiency may be low at this position due to the need for additional spark retard. To improve the engine efficiency, at t2 the fuel separator speed is increased to raise the electrical load on the engine. As a result, fuel separation rate increases and more of each of the high and low octane fuel is generated. Due to the availability of high octane fuel being lower than threshold 705, low octane fuel usage in the engine is maintained.

At t3, high octane fuel availability exceeds threshold 705. Therefore at t3, fuel separator speed is reduced and the electrical load applied on the engine is also reduced. In addition, due to the availability of more high octane fuel, high octane fuel usage in the engine is increased. Also, to improve engine efficiency while using the high octane fuel, a CVT speed ratio is adjusted to operate the engine in a lower engine speed and a higher engine load for a given power level. As such in the absence of CVT adjustments, the engine may have been operating with a relatively higher engine speed (not shown) and lower engine load (as depicted at dashed line 701).

At t4, the vehicle may be decelerated and an engine regenerative braking event may occur. At this time, fuel separator speed may be opportunistically increased. In this example, the increase in separator speed responsive to the regenerative braking event is to a higher speed than the increase in separator speed responsive to low engine load. For example, the separator speed is increased to a maximum speed at t4 during the regenerative braking event.

At t5, due to a change in driver demand, engine load may increase. At this time since there is sufficient amounts of both the high and low octane fuel, fuel separator speed is decreased. In addition, due to the higher availability of low octane fuel and a higher driver demand, low octane fuel usage in the engine is increased. Also, to improve engine efficiency while using the low octane fuel, a CVT speed ratio is adjusted to operate the engine in a higher engine speed and a lower engine load for the given power level. As such in the absence of CVT adjustments, the engine may have been operating with a relatively lower engine speed (not shown) and higher engine load (as depicted at dashed line 701).

At t6, driver demand may drop. Due to the lower engine load, and the presence of sufficient amounts of the high and low octane fuel, the fuel separator is disabled. At this time, engine torque is used to propel the vehicle and any excess torque is used to charge the system battery with a resulting rise in battery state of charge. At t7, the vehicle may transition to the electric mode and the vehicle may be propelled using motor torque. In addition, the fuel separator may be maintained disabled.

In this way, an electric fuel separator may be integrated into a hybrid vehicle to provide additional fuel economy benefits. By adjusting separator output based on fuel availability, as well as engine load, fuel separation and high octane fuel usage may be increased, improving engine performance and fuel economy. By increasing separator speed and/or pressure to increase the electrical load on an engine, an engine may be operated with higher efficiency. In addition by increasing the separator speed and/or pressure during regenerative braking events, fuel separation can be opportunistically increased using excess electrical energy and with reduced fuel costs. By using the motor of the hybrid vehicle and/or a CVT transmission to hold engine operation in a narrow operating range where usage of a selected fuel fraction is optimal while also maintaining a power level, even as driver demand changes, the benefits of the fuel separation system may be extended over a wider range of vehicle operation. By enhancing fuel separation and high octane fuel usage over a larger range of vehicle operating conditions, fuel economy is improved and knock incidence is reduced. Overall, vehicle performance and fuel economy can be improved through synergistic benefits of hybrid vehicle technology and fuel separation technology.

One example method for a hybrid vehicle including an engine, comprises: transferring engine output to a generator, and supplying electric power from the generator to an electric fuel separator without said supplied power being stored in a battery; and separating a fuel into higher octane and lower octane fractions at the separator. In the preceding example, additionally or optionally, the method further comprises, responsive to lower than threshold engine load while availability of the higher octane fraction is lower than a threshold level, increasing an output of the fuel separator to raise the engine load above the threshold. In any or all of the preceding examples, additionally or optionally, increasing the output of the fuel separator includes one or more of increasing a separator pump pressure and increasing a speed of fuel separation. In any or all of the preceding examples, additionally or optionally, the engine is operated with the raised load until the availability of the higher octane fraction is above the threshold level, a degree of raising engine load based on the availability of the higher octane fraction relative to the threshold level. In any or all of the preceding examples, additionally or optionally, the method further comprises, injecting one or more of the higher octane fraction and the lower octane fractions into the engine while separating the fuel, and increasing usage of the higher octane fraction responsive to the raised engine load. In any or all of the preceding examples, additionally or optionally, the method further comprises, in response to a rate of usage of the higher octane fraction at the raised engine load exceeding a fuel separation rate with the electrical power from the generator, reducing the output of the fuel separator to lower the engine load. In any or all of the preceding examples, additionally or optionally, the method further comprises, in response to engine electrical load being higher than a threshold electrical load, disabling the fuel separator. In any or all of the preceding examples, additionally or optionally, the method further comprises, in response to a regenerative braking event, transferring wheel torque to the generator and supplying electric power from the generator to the fuel separator to increase fuel separator output without storing the supplied electric power in the battery. In any or all of the preceding examples, additionally or optionally, the method further comprises operating the engine at an adjusted engine speed-load while separating the fuel, the adjusted engine speed-load based on the availability of the higher octane fraction, and further based on usage of the higher octane and lower octane fraction in the engine. In any or all of the preceding examples, additionally or optionally, the vehicle includes a continuously variable transmission (CVT) coupled to the engine, and wherein operating the engine at the adjusted engine speed-load includes selecting a CVT speed ratio matching the adjusted engine speed-load. In any or all of the preceding examples, additionally or optionally, the method further comprises, while using the lower octane fraction in the engine, responsive to an indication of knock, further adjusting the CVT speed ratio to raise the engine speed while lowering the engine load and maintaining a power level of the vehicle. In any or all of the preceding examples, additionally or optionally, operating at the adjusted engine speed-load includes adjusting a rate of charging/discharging the battery coupled to the generator while maintaining a power level of the vehicle. In any or all of the preceding examples, additionally or optionally, the method further comprises, responsive to lower than threshold engine load while availability of the higher octane fraction is above the threshold level, shutting down the engine, disabling the fuel separator, and propelling the vehicle using motor torque from the generator.

Another example method for a hybrid vehicle comprises: operating an engine to propel the vehicle and spin an electric motor without charging a battery coupled to the motor, the motor also coupled to vehicle wheels; separating a liquid fuel on-board the vehicle into high-octane and low-octane fuel fractions at an electric fuel separator driven by the spinning motor; and selecting one of the high-octane and low-octane fuel fractions for injection into the engine. In the preceding example, additionally or optionally, operating the engine while separating the fuel includes operating the engine at an adjusted engine speed-load, the adjusted engine speed-load based on the selecting and further based on an available amount of the high-octane fuel fraction. In any or all of the preceding examples, additionally or optionally the vehicle includes a continuously variable transmission coupled between the engine and vehicle wheels, and wherein operating the engine at the adjusted engine speed-load includes selecting a CVT speed ratio matching the adjusted engine speed-load. In any or all of the preceding examples, additionally or optionally, the adjusted engine speed-load includes a higher speed and lower load when the low-octane fraction is selected for injection into the engine, the higher speed raised as an indication of engine knock increases, and wherein the adjusted engine speed-load includes a lower speed and a higher load when the high-octane fraction is selected for injection into the engine. In any or all of the preceding examples, additionally or optionally, the method further comprises, in response to a regenerative braking event, braking vehicle wheels by transferring wheel torque to the motor, a larger portion of the wheel torque received at the motor used to increase an output of the fuel separator, a smaller, remaining portion of the wheel torque received at the motor used to charge the battery. In any or all of the preceding examples, additionally or optionally, the method further comprises, responsive to a drop in engine load below a threshold load, increasing an output of the fuel separator to maintain the engine load above the threshold load, and increasing usage of at least the high-octane fraction.

Another example hybrid vehicle system comprises: an engine coupled to vehicle wheels; an electric motor coupled to the vehicle wheels, the electric motor also coupled to a battery; a fuel separator driven by another electric motor coupled to the battery, the separator separating a fuel into high-octane and low-octane fractions; a first fuel injector for delivering the high-octane fraction from a first fuel tank into the engine; a second fuel injector for delivering the low-octane fraction from a second fuel tank into the engine; a continuously variable transmission (CVT); and a controller.

The controller may be configured with computer readable instructions stored on non-transitory memory for: transferring engine output to the motor and supplying electric power from the motor to the electric fuel separator without said supplied power being stored in a battery; separating the fuel into high-octane and low-octane fractions; when injecting the high-octane fuel into the engine, adjusting a speed ratio of the CVT to operate the engine at a first adjusted speed-load profile having a lower engine speed and a higher engine load for a given power level; and when injecting the low-octane fuel into the engine, adjusting the speed ratio of the CVT to operate the engine at a second adjusted speed-load profile having a higher engine speed and a lower engine load for the given power level. In the preceding examples, additionally or optionally, the controller includes further instructions for: in response to a regenerative braking event, increasing an output of the fuel separator, the output including one of a speed and a pressure of fuel separation; and in response to lower than threshold engine load, increasing the output of the fuel separator, wherein the increasing responsive to the regenerative braking event is larger than the increasing responsive to the lower than threshold engine load.

In a further presentation, a method for a hybrid vehicle comprises: operating an engine to propel the vehicle and spin a motor; and separating fuel on-board the vehicle at an electric fuel separator that is driven by the spinning motor. In yet another representation, a method comprises: while propelling a vehicle using engine torque, separating fuel on-board the vehicle at an electric fuel separator, the separator driven by an electric motor coupled to the engine; and in response to a regenerative braking event, increasing a speed of the motor and/or the fuel separator. In yet another representation, a method for a hybrid vehicle comprises: while propelling a vehicle using engine torque, separating fuel on-board the vehicle at an electric fuel separator, the separator driven by an electric motor coupled to the engine; and in response to engine load being below a threshold load, increasing a speed of the motor and/or fuel separator to raise the engine load above the threshold load.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle including an engine, comprising:
   transferring engine output to a generator
   supplying electric power from the generator to an electric fuel separator without the power required to operate the electric fuel separator being stored in a battery; and
   separating a fuel into higher octane and lower octane fractions at the electric fuel separator.

2. The method of claim 1, further comprising, responsive to lower than threshold engine load while availability of the higher octane fraction is lower than a threshold level, increasing an output of the electric fuel separator to raise the engine load above the threshold level.

3. The method of claim 2, wherein increasing the output of the electric fuel separator includes one or more of increasing a separator pump pressure and increasing a speed of fuel separation.

4. The method of claim 2, wherein the engine is operated with the raised load until the availability of the higher octane fraction is above the threshold level, a degree of raising engine load based on the availability of the higher octane fraction relative to the threshold level.

5. The method of claim 2, further comprising,
   injecting one or more of the higher octane fraction and the lower octane fractions into the engine while separating the fuel, and
   increasing usage of the higher octane fraction responsive to the raised engine load.

6. The method of claim 5, further comprising, in response to engine electrical load being higher than a threshold electrical load, disabling the electric fuel separator.

7. The method of claim 5, further comprising operating the engine at an adjusted engine speed-load while separating the fuel, the adjusted engine speed-load based on the availability of the higher octane fraction, and further based on usage of the higher octane and lower octane fraction in the engine.

8. The method of claim 7,
   wherein the hybrid vehicle includes a continuously variable transmission (CVT) coupled to the engine, and wherein operating the engine at the adjusted engine speed-load includes selecting a CVT speed ratio matching the adjusted engine speed-load.

9. The method of claim 8, further comprising, while using the lower octane fraction in the engine, responsive to an indication of knock, further adjusting the CVT speed ratio to raise the engine speed while lowering the engine load and maintaining a power level of the hybrid vehicle.

10. The method of claim 7, wherein operating at the adjusted engine speed-load includes adjusting a rate of charging/discharging the battery coupled to the generator while maintaining a power level of the hybrid vehicle.

11. The method of claim 2, further comprising, responsive to lower than threshold engine load while availability of the higher octane fraction is above the threshold level,
shutting down the engine,
disabling the electric fuel separator, and
propelling the hybrid vehicle using motor torque from the generator.

12. The method of claim 1, further comprising, in response to a regenerative braking event,
transferring wheel torque to the generator and
supplying electric power from the generator to the fuel separator to increase fuel separator output without storing the power required to operate the electric fuel separator in the battery.

13. A method for a hybrid vehicle, comprising:
operating an engine to propel the hybrid vehicle
spinning an electric motor without charging a battery coupled to the electric motor, the electric motor also coupled to vehicle wheels;
separating a liquid fuel on-board the hybrid vehicle into high-octane and low-octane fuel fractions at an electric fuel separator driven by the spinning electric motor; and
selecting one of the high-octane and low-octane fuel fractions for injection into the engine.

14. The method of claim 13, wherein operating the engine while separating the fuel includes operating the engine at an adjusted engine speed-load, the adjusted engine speed-load based on the selecting and further based on an available amount of the high-octane fuel fraction.

15. The method of claim 14,
wherein the hybrid vehicle includes a continuously variable transmission (CVT) coupled between the engine and vehicle wheels, and
wherein operating the engine at the adjusted engine speed-load includes selecting a CVT speed ratio matching the adjusted engine speed-load.

16. The method of claim 14,
wherein the adjusted engine speed-load includes a higher speed and lower load when the low-octane fraction is selected for injection into the engine, the higher speed raised as an indication of engine knock increases, and
wherein the adjusted engine speed-load includes a lower speed and a higher load when the high-octane fraction is selected for injection into the engine.

17. The method of claim 13, further comprising, in response to a regenerative braking event, braking vehicle wheels by transferring wheel torque to the electric motor, a larger portion of the wheel torque received at the electric motor used to increase an output of the electric fuel separator, a smaller, remaining portion of the wheel torque received at the electric motor used to charge the battery.

18. The method of claim 13, further comprising, responsive to a drop in engine load below a threshold load, increasing an output of the electric fuel separator to maintain the engine load above the threshold load.

19. A hybrid vehicle system, comprising:
an engine coupled to vehicle wheels;
an electric motor coupled to the vehicle wheels, the electric motor also coupled to a battery;
an electric fuel separator driven by another electric motor coupled to the battery, the electric fuel separator separating a fuel into high-octane and low-octane fractions;
a first fuel injector for delivering the high-octane fraction from a first fuel tank into the engine;
a second fuel injector for delivering the low-octane fraction from a second fuel tank into the engine;
a continuously variable transmission (CVT); and
a controller with computer readable instructions stored on non-transitory memory for:
transferring engine output to the electric motor
supplying electric power from the electric motor to the electric fuel separator without said supplied power being stored in a battery;
separating the fuel into high-octane and low-octane fractions;
when injecting the high-octane fuel into the engine, adjusting a speed ratio of the CVT to operate the engine at a first adjusted speed-load profile having a lower engine speed and a higher engine load for a given power level; and
when injecting the low-octane fuel into the engine, adjusting the speed ratio of the CVT to operate the engine at a second adjusted speed-load profile having a higher engine speed and a lower engine load for the given power level.

20. The system of claim 19, wherein the controller includes further instructions for:
in response to a regenerative braking event, increasing an output of the electric fuel separator, the output including one of a speed and a pressure of fuel separation; and
in response to lower than threshold engine load, increasing the output of the electric fuel separator, wherein the increasing responsive to the regenerative braking event is larger than the increasing responsive to the lower than threshold engine load.

* * * * *